United States Patent
DeMeritt et al.

(10) Patent No.: US 11,808,992 B2
(45) Date of Patent: Nov. 7, 2023

(54) LENS-BASED CONNECTOR ASSEMBLIES HAVING PRECISION ALIGNMENT FEATURES AND METHODS FOR FABRICATING THE SAME

(71) Applicant: Corning Research & Development Corporation, Corning, NY (US)

(72) Inventors: Jeffery Alan DeMeritt, Painted Post, NY (US); James Scott Sutherland, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/344,329

(22) Filed: Jun. 10, 2021

(65) Prior Publication Data

US 2021/0302664 A1     Sep. 30, 2021

Related U.S. Application Data

(62) Division of application No. 16/778,000, filed on Jan. 31, 2020, now Pat. No. 11,105,985.

(51) Int. Cl.
    *G02B 6/32*         (2006.01)
    *G02B 6/38*         (2006.01)
    (Continued)

(52) U.S. Cl.
    CPC ............ *G02B 6/3851* (2013.01); *G02B 6/322* (2013.01); *G02B 6/3853* (2013.01);
    (Continued)

(58) Field of Classification Search
    CPC ........ G02B 6/25; G02B 6/322; G02B 6/3831; G02B 6/3838; G02B 6/3851;
    (Continued)

(56) References Cited

U.S. PATENT DOCUMENTS 4,812,002 A     3/1989     Kato et al.
5,281,301 A *    1/1994     Basavanhally ........ G02B 6/362
                                                               359/620

(Continued)

FOREIGN PATENT DOCUMENTS

CN        102183824 A     9/2011
EP        3021144 A1     5/2016

(Continued)

OTHER PUBLICATIONS

European Patent Application No. 21153472.2, Extended European Search Report dated May 28, 2021; 11 pages; European Patent Office.

(Continued)

*Primary Examiner* — Ryan A Lepisto
(74) *Attorney, Agent, or Firm* — Michael E. Carroll, Jr.

(57) ABSTRACT

Lens-based optical connector assemblies and methods of fabricating the same are disclosed. In one embodiment, a lens-based connector assembly includes a glass-based optical substrate includes at least one optical element within the optical substrate, and at least one alignment feature positioned at an edge of the glass-based optical substrate, wherein the at least one alignment feature is located within 0.4 μm of a predetermined position with respect to the at least one optical element along an x-direction and a y-direction. The lens-based connector assembly further includes a connector element including a recess having an interior surface, The interior surface has at least one connector alignment feature. The glass-based optical substrate is disposed within the recess such that the at least one alignment feature of the glass-based optical substrate engages the at least one connector alignment feature.

25 Claims, 39 Drawing Sheets

(51) Int. Cl.
*G02B 6/42* (2006.01)
*G02B 6/25* (2006.01)

(52) U.S. Cl.
CPC ......... *G02B 6/3885* (2013.01); *G02B 6/4204* (2013.01); *G02B 6/4206* (2013.01); *G02B 6/4219* (2013.01); *G02B 6/25* (2013.01); *G02B 6/3831* (2013.01); *G02B 6/3838* (2013.01); *G02B 6/3865* (2013.01)

(58) Field of Classification Search
CPC .. G02B 6/3853; G02B 6/3865; G02B 6/3885; G02B 6/4204; G02B 6/4206; G02B 6/4219
See application file for complete search history.

(56) References Cited

U.S. PATENT DOCUMENTS

| | | |
|---|---|---|
| 5,394,498 A | 2/1995 | Hinterlong et al. |
| 5,907,650 A | 5/1999 | Sherman et al. |
| 6,470,123 B1 | 10/2002 | Sherman et al. |
| 6,659,654 B2 | 12/2003 | Kao |
| 6,766,086 B1 | 7/2004 | Sherman et al. |
| 6,773,166 B2 | 8/2004 | Trezza et al. |
| 6,823,127 B2 | 11/2004 | Nasiri et al. |
| 7,804,043 B2 | 9/2010 | Deshi |
| 8,270,784 B2 | 9/2012 | Thomson et al. |
| 8,821,033 B2 | 9/2014 | Rosenberg et al. |
| 9,229,169 B2 | 1/2016 | Doany et al. |
| 9,645,330 B2 | 5/2017 | Kon et al. |
| 10,114,174 B2 | 10/2018 | Senhour et al. |
| 11,105,985 B2 * | 8/2021 | DeMeritt ............. G02B 6/4204 |
| 2002/0131703 A1 | 9/2002 | Velikov |
| 2003/0075790 A1 | 4/2003 | Steinberg et al. |
| 2003/0123810 A1 | 7/2003 | Yang et al. |
| 2003/0202768 A1 | 10/2003 | Nasiri et al. |
| 2003/0215206 A1 | 11/2003 | Nakajima |
| 2004/0131326 A1 | 7/2004 | Miller et al. |
| 2004/0190851 A1 | 9/2004 | Garner et al. |
| 2005/0123246 A1 | 6/2005 | Morse et al. |
| 2006/0245694 A1 | 11/2006 | Chen et al. |
| 2010/0178007 A1 | 7/2010 | Thomson et al. |
| 2010/0284651 A1 | 11/2010 | Kraehenbuehl et al. |
| 2011/0026882 A1 | 2/2011 | Budd et al. |
| 2013/0208358 A1 | 8/2013 | Psaila et al. |
| 2015/0104135 A1 | 4/2015 | Bushnell et al. |
| 2016/0041344 A1 | 2/2016 | Wasserbauer |
| 2017/0052321 A1 | 2/2017 | Bushnell et al. |
| 2017/0184793 A1 | 6/2017 | Watanabe et al. |
| 2017/0219778 A1 | 8/2017 | Filipowicz et al. |
| 2018/0335571 A1 | 11/2018 | Wada |
| 2018/0335573 A1 | 11/2018 | Wada et al. |
| 2018/0335579 A1 | 11/2018 | Wada |
| 2019/0384024 A1 | 12/2019 | Neukirch et al. |
| 2020/0041731 A1 | 2/2020 | Cuno et al. |
| 2020/0264386 A1 | 8/2020 | Hodge et al. |

FOREIGN PATENT DOCUMENTS

| | | |
|---|---|---|
| JP | 2013-071335 A | 4/2013 |
| KR | 10-2014-0022981 A | 2/2014 |
| WO | 2012/005454 A2 | 1/2012 |
| WO | 2018/089286 A1 | 5/2018 |

OTHER PUBLICATIONS

Nikumb et al; "Precision Glass Machining, Drilling and Profile Cutting by Short Pulse Lasers"; Thin Solid Films, 477, pp. 216-221 (2005).

* cited by examiner

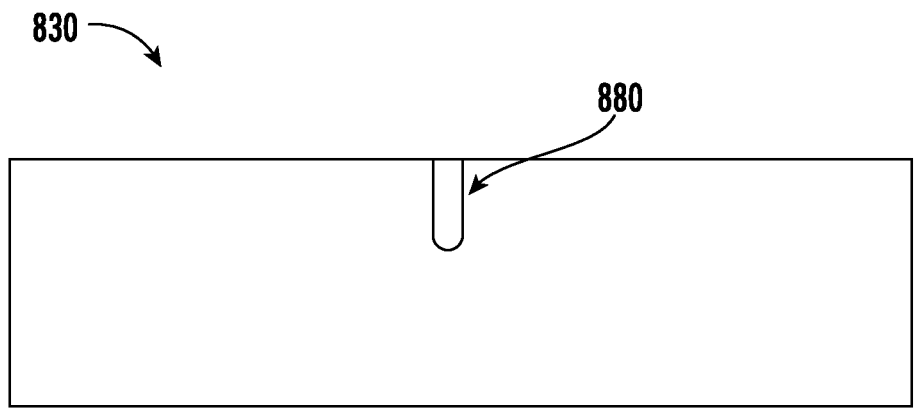
FIG. 32
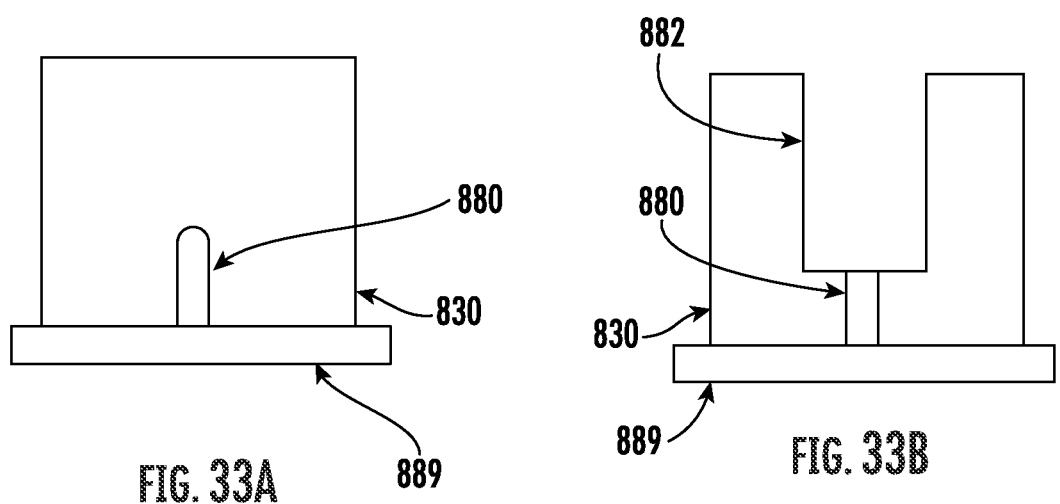
FIG. 33A
FIG. 33B
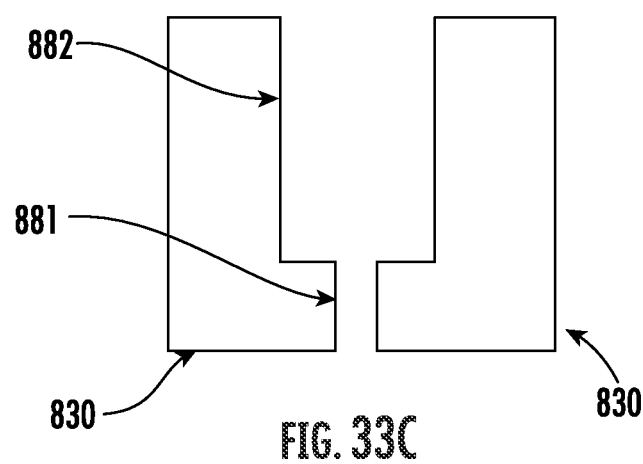
FIG. 33C

LENS-BASED CONNECTOR ASSEMBLIES HAVING PRECISION ALIGNMENT FEATURES AND METHODS FOR FABRICATING THE SAME

CROSS-REFERENCE TO RELATED APPLICATIONS

This application is a divisional of U.S. patent application Ser. No. 16/778,000 filed on Jan. 31, 2020, the content of which is relied upon and incorporated herein by reference in its entirety, and the benefit of priority under 35 U.S.C. § 120 is hereby claimed.

BACKGROUND

Technical Field

The present disclosure generally relates to optical connections and, more particularly, lens-based connector assemblies having alignment features fabricated by a laser process.

Background

Benefits of optical communication include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections.

Optical interconnects in data centers use cables containing hundreds or thousands of optical fibers which are pulled through ducts as long as 2 km. These optical interconnects are often installed in ducts before they are spliced to shorter lengths of optical fiber previously factory-assembled to connectors. Joining such a large number of optical fibers to pigtails (for example 3,456) by fusion splicing generally produces joints with very low optical loss, but it is expensive because of the complexity of the work, the level of craft, and the long processing time required. Fusion splicing may also produce occasional high loss connections.

Multi-fiber connectors built around precise injection molded hole arrays with 12, 16, 24, or 32 single-mode fibers are available but connectors with a higher number of fibers present extreme technical challenges. One such challenge is the need to have a precision fiber array in which a large number of fibers (e.g. 96 or more) are held in precise positions, with position errors smaller than 1 μm. This is beyond the capability of the connector molding processes used for current commercial products.

Another challenge is related to the need to ensure positive contact between each fiber pair in a mated high fiber-count connector. This is typically accomplished by maintaining the height of all finished fibers to sub-micron accuracy relative to the ferrule end-face surface and applying a mating force to elastically accommodate any remaining error. Increasing the number of fibers moves these requirements, too, out of reach of present connector design and manufacturing by requiring unachievable precision of fiber protrusion on a large array and unacceptably high axial forces to successfully mate.

Alternative structures and methods for optically coupling a large number of optical fibers together may be desired.

SUMMARY

In one embodiment, a lens-based connector assembly includes a glass-based optical substrate including at least one optical element within the optical substrate, and at least one alignment feature positioned at an edge of the glass-based optical substrate, wherein the at least one alignment feature is located within 0.4 μm of a predetermined position with respect to the at least one optical element along an x-direction and a y-direction. The lens-based connector assembly further includes a connector element including a recess having an interior surface, The interior surface has at least one connector alignment feature. The glass-based optical substrate is disposed within the recess such that the at least one alignment feature of the glass-based optical substrate engages the at least one connector alignment feature.

In another embodiment, a method of fabricating a glass-based optical substrate include forming at least one laser damage area within a glass sheet by applying a laser beam to the glass sheet. The at least one laser damage area at least partially defines at least one alignment feature, and the at least one laser damage area is located within 0.4 μm of a predetermined position with respect to at least one optical element along an x-direction and a y-direction. The method further includes etching the glass sheet in an etching solution to remove a portion of the glass-based optical substrate, thereby defining the at least one alignment feature. The method also includes singulating at least one glass-based optical substrate from the glass sheet such that the at least one alignment feature is located at an edge of the glass-based optical substrate.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

FIG. 32 depicts an example laser damage area that partially extends into a glass-based optical substrate according to one or more embodiments described and illustrated herein;

FIG. 33A depicts the example glass-based optical substrate of FIG. 32 disposed on a support substrate according to one or more embodiments described and illustrated herein;

FIG. 33B depicts the example glass-based optical substrate and support substrate of FIG. 33A after dicing with a dicing saw according to one or more embodiments described and illustrated herein;

FIG. 33C depicts the example glass-based optical substrate of FIG. 33B after etching the laser damage area according to one or more embodiments described and illustrated herein;

DETAILED DESCRIPTION

Figure 1:
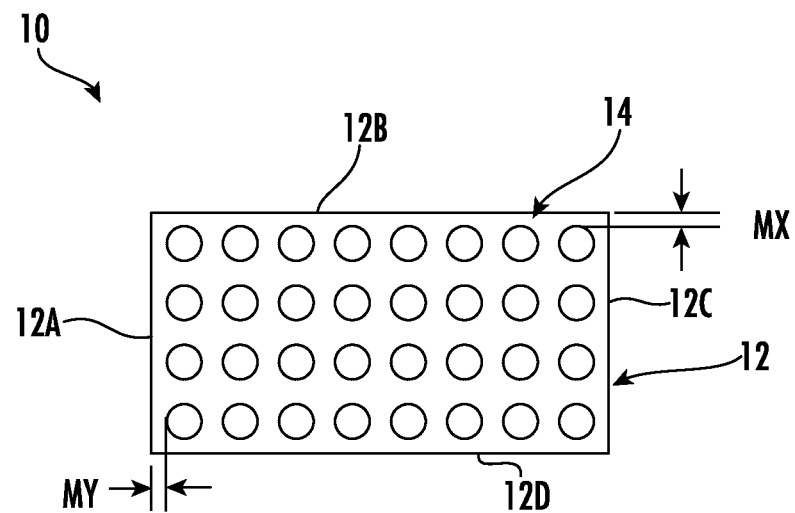
FIG. 1 depicts an example lens array substrate having four precision edges according to one or more embodiments described and illustrated herein.

Embodiments described herein are directed to optical assemblies, lens-based connectors, and methods of fabricating optical assemblies and lens-based connectors. Embodiments of the present disclosure position a precisely matching lens array in front of optical fiber end faces and accomplish connector-to-connector mating in an axially and laterally forgiving expanded beam space. More specifically, embodiments provide high fiber count expanded beam connectors (HFC/EB) that have precisely formed matching arrays of holes and of lenses, that precisely and permanently mount these two elements and their matching optical fibers together, and that contain this sub-assembly in a connector body which controls all necessary degrees of freedom for successful optical coupling. Embodiments ensure the accurate location of a lens array and an optical fiber array within the body of a lens-based optical connector such as an HFC/EB connector.

The embodiments described herein efficiently establish a highly accurate set of physical references to a fiber hole array using the same laser damage and etch process used for production of the fiber hole array itself and capable of restraining three critical degrees of freedom: roll, X translation and Y translation.

Example laser damage and etch processes are described in U.S. Patent Publication Number 2013/0208358 and U.S. Pat. No. 8,270,784. The laser damage and etch process produces features, such as holes, lenses, edges, notches, channels, and the like, in two steps. First, a suitable laser and precise motion control equipment write a pattern of damage in a body of glass. Second, an etching solution etches the glass to remove the areas laser-induced damage and leave precisely formed surfaces in the glass body. However, other laser processes may be used, such as laser damage processes that ablate and eject material forming surfaces.

The laser damage and etch process is capable of providing arbitrary three-dimensional surfaces containing features which are located relative to one another with sub-micron accuracy. However, the accurate alignment of this near perfect array of surfaces to a higher level of assembly should either be accomplished by active alignment, a vision system or, ideally, passive mechanical location. Thus, it may be useful to not only form a feature array such as holes for fiber location but also to form at the same time appropriate datum surfaces which support the location of the sub-assembly in an HFC/EB connector.

Forming these surfaces and features by a laser damage and etch process can be very time consuming and expensive. A limitation of the laser damage and etch process is that, although the focused laser spot can be steered rapidly through the body of the part, the focal spot of the laser itself is very small (on the order of a micron or so characteristic dimension) and hence the rate of damage measured in mm$^2$ per second is very low. This results in long process times and, because of the expense of the equipment used, a high cost per unit surface area of finished product. So though it is physically possible to write hole surfaces and all singulation surfaces in one set-up, and this would provide useful and accurate reference surfaces for array location, this approach may be impractical in that it adds high and unnecessary cost to the resulting component.

Embodiments of the present disclosure provide for forming suitable datum or reference surfaces (also referred to herein as alignment surfaces) for the alignment of feature sets into a higher level assembly at much smaller penalties of time and cost than discussed above. This is done by combining the coarse and low-cost process of singulation with the highly accurate but slow and costly process of laser inscription. Generally, embodiments write and etch very short lengths of datum surfaces which are then removed by etching via laser, scribe and cleave or dicing saw.

Embodiments include optical glass-based optical components having a laser-formed mechanical reference surface with any or all of the following attributes:
- minimized laser-formed feature length composing only a portion of the singulation path;
- minimized laser-formed feature height with the vertical balance of material mechanically removed;
- repetitive formation of mechanical reference surfaces in multiple cells of a photonic wafer;
- interrupted singulation of individual cells by laser ablation, laser thermal separation, scribe and break or dicing with a diamond saw;
- laser formed mechanical reference surfaces which are either recessed into the edge of the finished piece part or stand proud of the edge of finished piece part;
- laser formed mechanical reference surfaces of any geometry which affords accurate location against a mating part; and
- a mechanical reference surface with a reduced surface area nonetheless supportive of accurate location of optical or mechanical features with respect to an external reference.

One commercial damage and etch forming process requires significant time to write ninety-six holes and an additional significant amount of time to outline or 'singulate' the part with a precision exterior. Embodiments described herein reduces the singulation portion of the writing process from many hours to minutes, and potentially to fractions of a single minute. This represents a cost reduction for the writing stage of the process of at least 50%, and much more in designs with fewer internal surfaces.

It is possible to further reduce the cost of formation of these datum surfaces by controlling the extent of the damage region in the direction of glass thickness and then dicing out material above and/or below the damage area before singulation. In that the laser writing time is a function of the area to be damaged reducing the thickness of the datum features reduces their cost of formation in approximate proportion.

Additionally, indented or negative written surfaces for the creation of useful datum features has the advantage that it enables any of the generally used methods of wafer singulation by a cutting instrument (e.g., dicing by saw, scribe and break, laser separation) and call for no step or interruption of the dicing pattern. This is true because a single straight singulation line extending from one edge of the multi-cell wafer will traverse only empty space from which glass has been removed in the vicinity of datum cut-outs. In particular, these datum cut-outs inside of the major outline of the piece part permit singulation by methods having desirable cost and reliability, such as a single straight cut using a dicing saw or other simple singulation methods such as laser perforation.

Various embodiments of optical assemblies and lens-based optical connectors having glass-based optical components with precise alignment features are described in detail below.

Referring now to FIG. 1, an example glass-based optical substrate configured as a lens array substrate 10 having an array of lenses 14 for a lens-based optical connector is schematically illustrated. As described in more detail below, the lens array substrate 10 may combined with other components such as ferrules, sleeves, connector housings and the like to form a lens-based optical connector. It should be understood that the features and processes of the lens array substrate 10 may be utilized in other glass-based optical substrates, such as fiber hole array substrates (see FIG. 2), for example.

The lens array can be formed using any lens forming process, such as by a laser-based lens forming process, photoactivation followed by heat treatment to produce localized glass swelling, or hot glass pressing. The approaches described herein can be applied to glass-based substrates with any precisely positioned optical elements located in or on their substrates, including etched features such as holes or trenches, and planar optical waveguides fabricated using IOX (Ion Exchange), dielectric material deposition, and/or waveguide etching processes.

As used herein, "glass-based substrates" includes glass materials, ceramic materials, and glass-ceramic materials.

The example lens array substrate 10 of FIG. 1 is configured as a rectangle having a first precision edge 12A, a second precision edge 12B, a third precision edge 12C, and a fourth precision edge 12D. However, it should be understood that the lens array substrate 10 may take other shapes, such as circular, square, triangular, and arbitrary shapes.

As used herein, "precision edges," "precision features," "alignment features," and similar terms refer to edges and features formed by a precision laser process that forms both the precision features and the optical elements of the optical substrate (e.g., lenses in the case of lens substrates and fiber holes in the case of fiber hole array substrate). The precision edges, precision features, alignment features, and the like have a smaller tolerance than edges and features formed by other methods that are rapid and low cost.

One technique for making the lens array substrate smaller involves creating a precision laser formed edge around the perimeter of the glass-based substrate (e.g., the lens array substrate 10). The margins MX and MY between the lens array 14 and the edge 12 of the lens array substrate 10 can be made small (e.g., 0.1-0.5 µm), which allows the lens array substrate 10 to be more compact. In the embodiments described herein, the alignment feature(s) and/or precision edge(s) is located within 0.4 µm of a predetermined position with respect to a nearest optical element along an x-direction and a y-direction, or within 0.3 µm of a predetermined position with respect to a nearest optical element along an x-direction and a y-direction, or within 0.2 µm of a predetermined position with respect to a nearest optical element along an x-direction and a y-direction, or within 0.1 µm of a predetermined position with respect to a nearest optical element along an x-direction and a y-direction. These precise alignment features and/or precision edges allow the glass-based substrate to be precisely aligned with other optical components in the optical assembly.

Figure 2:
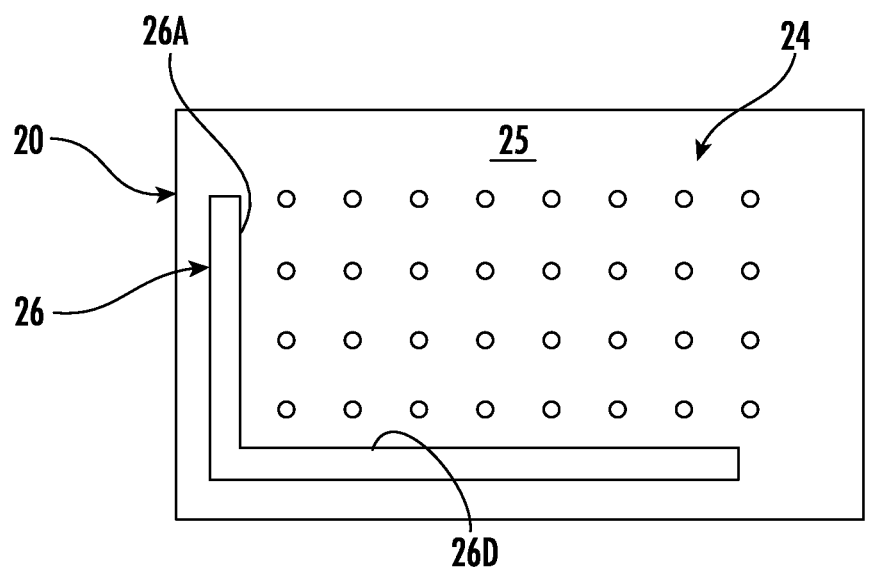
FIG. 2 depicts an example ferrule end face having an alignment stop according to one or more embodiments described and illustrated herein.
Figure 3:
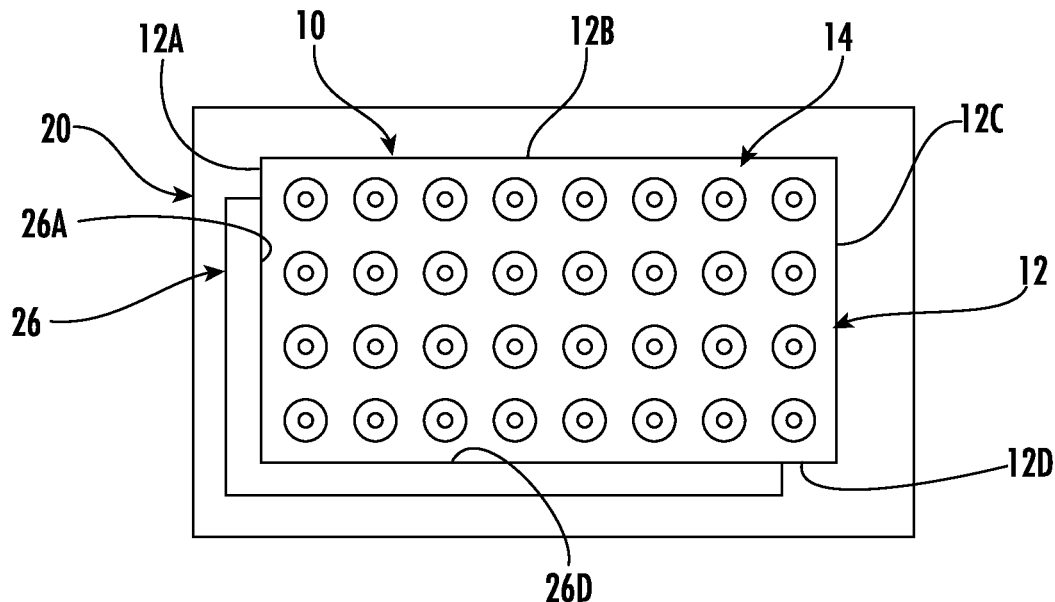
FIG. 3 depicts the lens array substrate of FIG. 1 coupled to the ferrule end face of FIG. 2 according to one or more embodiments described and illustrated herein.

Expanded beam optical connectors require precise alignment of an array of optical fibers to an array of collimating lenses 14, where the lateral misalignment (in the direction perpendicular to the optical fiber axis) between optical fiber centers and lens centers is preferably less than 0.5 µm. FIG. 2 illustrates an array of fiber holes 24 formed in the ferrule end face 25 of an example ferrule 20. The ferrule 20 can be formed by a precision injection molding process, where the fiber hole array 24 is aligned to external surfaces of the ferrule 20 (which can be round, or square as shown in FIG. 2). The ferrule end face 25 also provides an alignment feature configured as a raised L-shaped precision molded alignment stop 26, where a first surface 26A locates a first edge 12A of the lens array substrate 10 with respect to the array of fiber holes 24, and a second surface 26B locates the fourth edge 12D of the lens array substrate 10 with respect to the array of fiber holes 24 (FIG. 3). Thus, the L-shaped precision molded alignment stop 26 aligns the array of lenses 14 with the array of fiber holes 24 in the X and Y directions. The lens array substrate 10 may be attached to the ferrule end face 25 using a UV curable adhesive that is index matched to fused silica for low back reflection, for example Epotek 353HYB.

Figure 4:
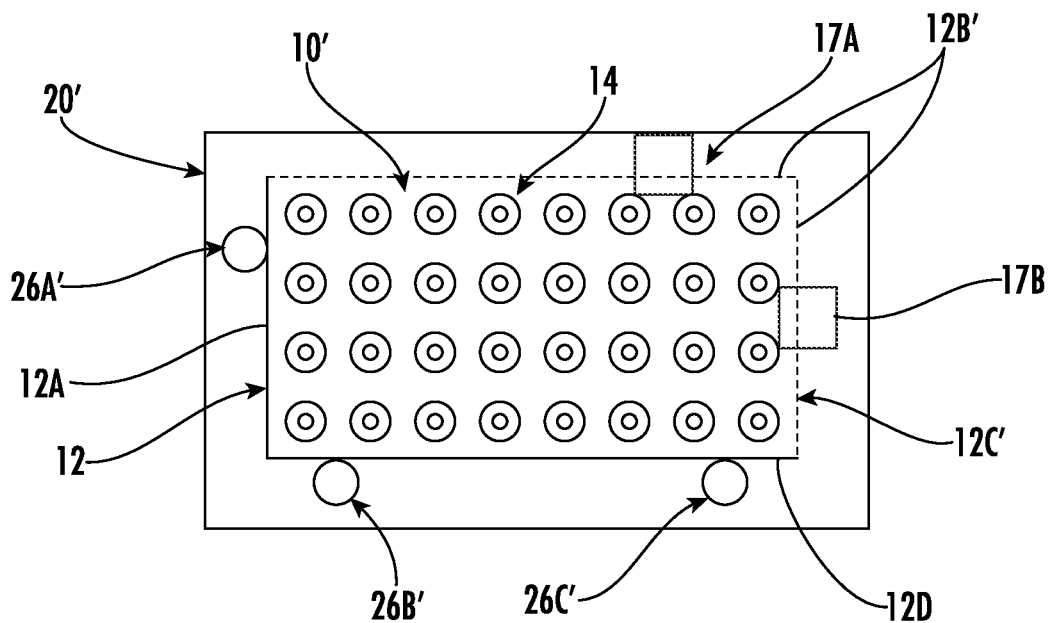
FIG. 4 depicts another example lens array substrate coupled to another example ferrule end face having multiple alignment posts according to one or more embodiments described and illustrated herein.

A disadvantage of the laser formed perimeter edge approach is that it requires a relatively long laser damage edge length, increasing laser processing time and cost. Referring now to FIG. 4, the ferrule end face L-shaped alignment stop 26 of FIG. 3 may be replaced with several alignment posts 26' (e.g., a first alignment post 26A', a second alignment post 26B', and a third alignment post 26C'). The alignment posts 26' can be molded into the ferrule end face 25 as described above. Alternatively, the alignment posts 26' may be configured as pins that are inserted into precision holes (not shown) formed in the ferrule end face 25. This approach may be attractive in some embodiments because it allows fibers that are inserted into the ferrule holes to be easily polished prior to lens array substrate 10' attachment.

Because the lens array substrate 10, 10' of FIGS. 3 and 4, respectively, only contact the alignment features of the ferrule 20, 20' on two precision edges (i.e., the first edge 12A and the fourth edge 12B), only two edges can be precision edges or have precision features thereon. FIG. 4 illustrates that the second edge 12B' and the third edge 12C' of the lens array substrate 10' are non-precision surfaces that have greater tolerances than the precision first edge 12A and the precision fourth edge 12D. The non-precision edges may be formed by less expensive cutting processes, such as mechanical cutting, mechanical scoring and breaking, or less-precise laser cutting processes. Non-precise edges are illustrated herein as dashed lines for clarity and illustration.

In the example of FIG. 4, the lens array substrate 10' is temporarily positioned on the ferrule end face 25 during assembly using retaining clip features that are molded into the ferrule end face 25 (e.g., retaining first clip feature 17A and second retaining clip feature 17B). The lens array substrate 10 may then be secured to the ferrule end face 25 by a UV curable adhesive, for example. However, it should be understood that embodiments are not limited to retaining clip features.

Figure 5:
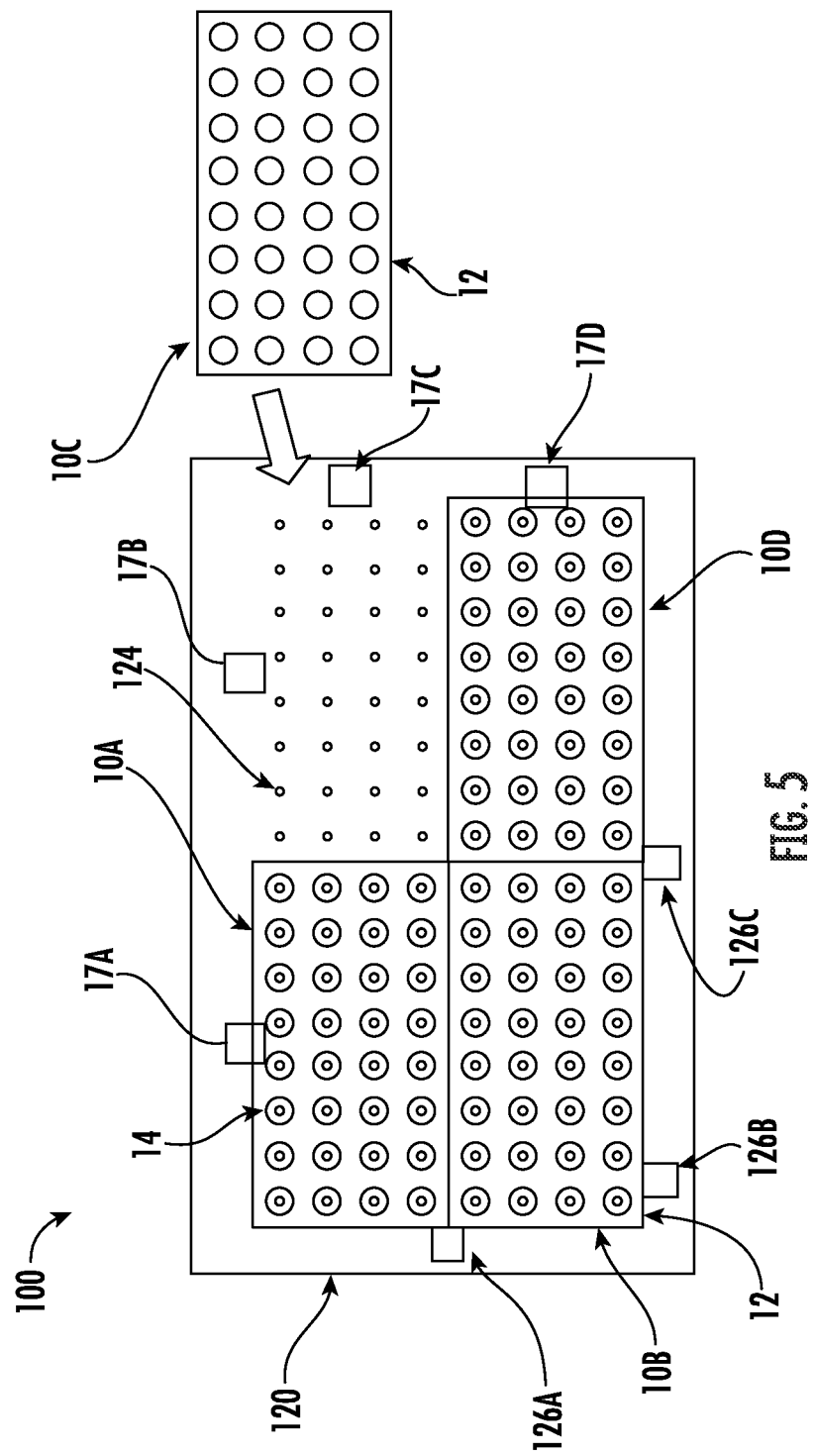
FIG. 5 depicts an example partial array of lens array substrates coupled to an example ferrule end face according to one or more embodiments described and illustrated herein.
Figure 6:
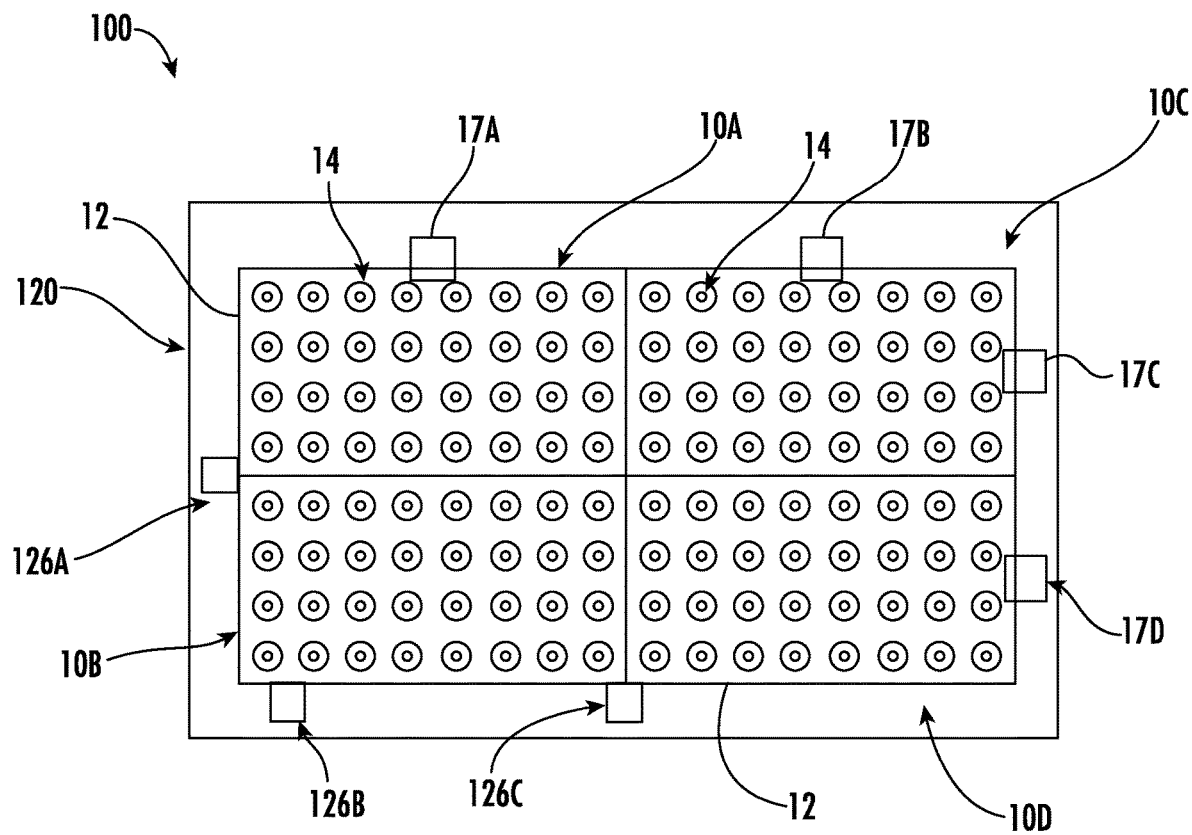
FIG. 6 depicts an example fully assembled array of lens array substrates coupled to the example ferrule end face of FIG. 5 according to one or more embodiments described and illustrated herein.

In some embodiments, multiple lens array substrates (e.g., lens array substrates 10A, 10B, 10C, and 10D) can be attached to the same ferrule end face 125 of a ferrule 120 by tiling them in an array, as shown in FIGS. 5 and 6. The ferrule end face 125 comprises alignment features configured as a first alignment feature 126A, a second alignment feature 126B, and a third alignment feature 126C configured as squares providing a precise flat surface for contacting the lens array substrates 10A-10D. It should be understood that any number of alignment features may be provided. Additionally, the alignment feature for a tiled lens array substrate assembly may be configured as the raised L-shaped precision molded alignment stop 26 as shown in FIGS. 2 and 3.

Because the edges 12 of the lens array substrates 10A-10D are precisely formed, as the lens array substrates 10A-10D are forced into each other in both in X and Y directions, lenses 14 on each lens array substrate 10A-10D become aligned to fiber alignment hole 124 centers on the ferrule end face 125. Thus, each edge 12 of the lens array substrates 10A-10D are precision edges formed by a precision laser process. FIG. 5 illustrates the third lens array substrate 10C being positioned onto the ferrule end face 125 and FIG. 6 illustrates all four lens array substrate 10A-10D positioned onto the ferrule end face 125. The alignment features 126A-126C contact the edges 12 of the first lens array substrate 10A, the second lens array substrate 10B, and the fourth lens array substrate 10D to provide X and Y direction alignment. The precision edges 12 of each lens array substrate 10A-10D also provide alignment.

Figure 7:
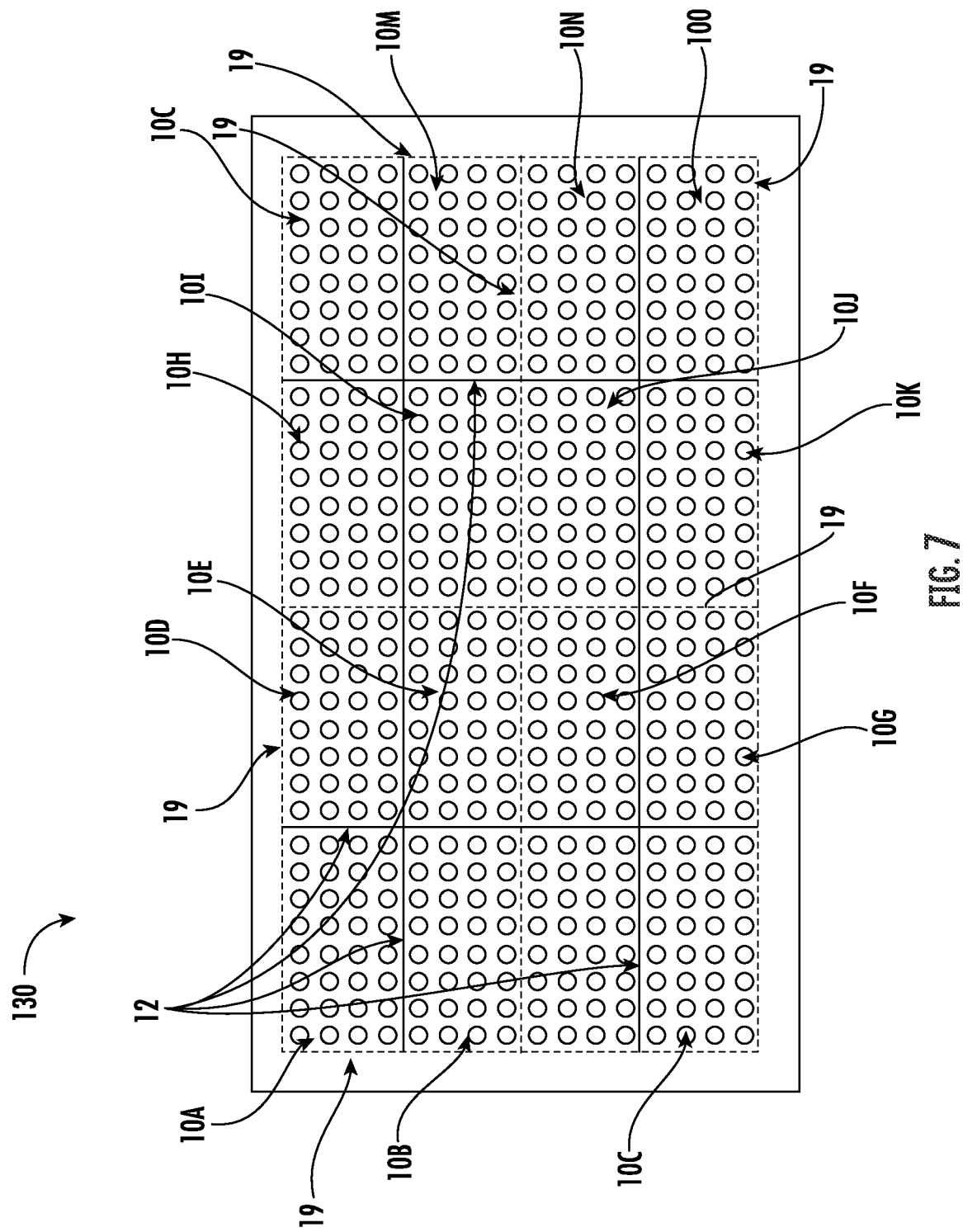
FIG. 7 depicts an example glass sheet for singulating a plurality of example lens array substrates according to one or more embodiments described and illustrated herein.

Referring now to FIG. 7, if only a single lens array substrate 10 is applied to a ferrule end face, then a glass sheet 130 (e.g., a glass-based sheet) that the lens array substrate 10 is fabricated from can be diced using a combination of laser damage and etch edge to form precision edges 12, and saw-dicing to form non-precision edge 12' by use of a dicing saw along dicing lines 19. This approach helps by reducing the amount of time and cost associated with laser forming of precision edges 12 in half. The lens array substrates 10 separated from the glass sheet 130 then include two precision edges 12 and two non-precision edges 12' after separation.

Figure 8:
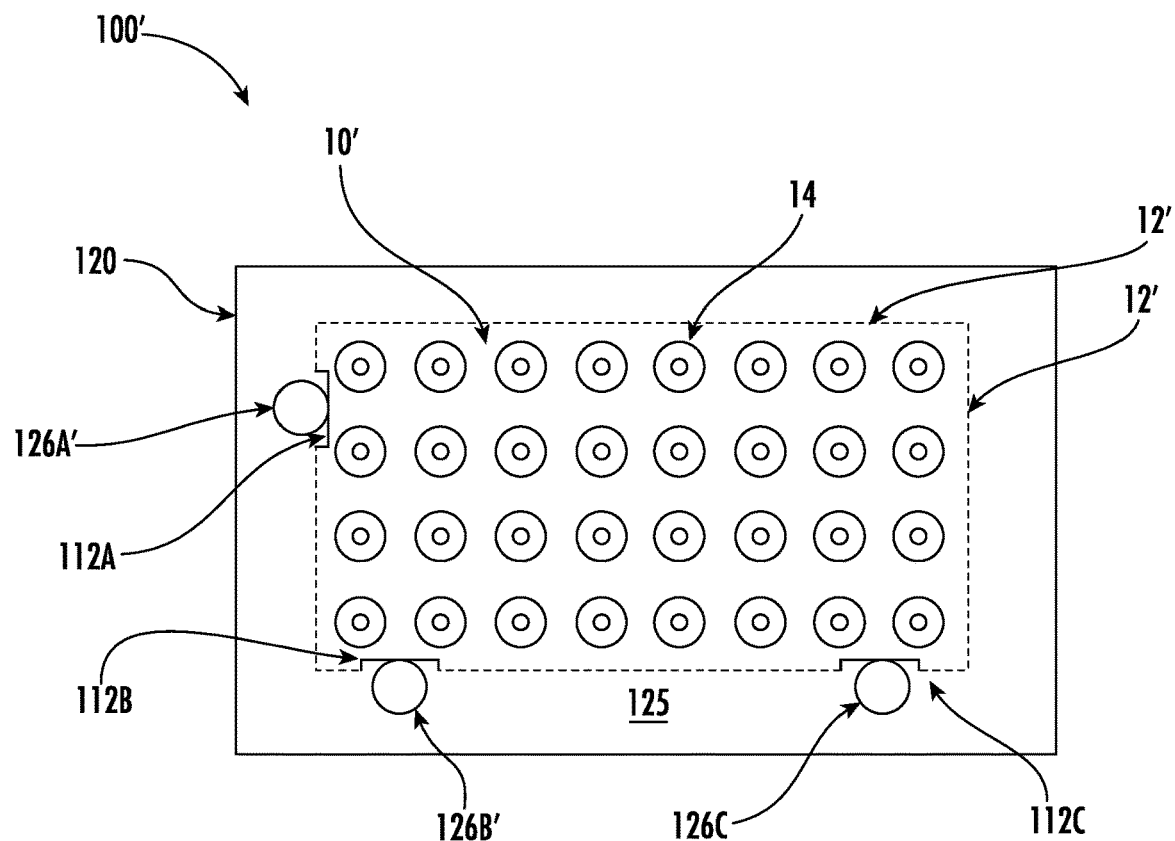
FIG. 8 depicts an example lens array substrate having alignment features in non-precision edges and coupled to an example ferrule end face according to one or more embodiments described and illustrated herein.

Embodiments may further reduce the amount of time required to process precision edges and/or features. Referring now to FIG. 8, one technique for reducing the processing time and cost associated with glass substrate edge precision laser forming is to only form precision edges at specific locations on the lens array substrate 10. FIG. 8 illustrates a lens array substrate having non-precision edges 12'. However, negative alignment features configured as a first datum notch 112A, a second datum notch 112B, and a third datum notch 112C are formed in the non-precision edges 12'. It should be understood that any number of datum notches may be provided. The first through third datum notches 112A-112C are positioned so that they are coarsely aligned with first through third alignment posts 126A-126C on the ferrule end face 125. The use of datum notches reduces the surface area required for precision edges, and therefore reduces processing time and cost.

Figure 9:
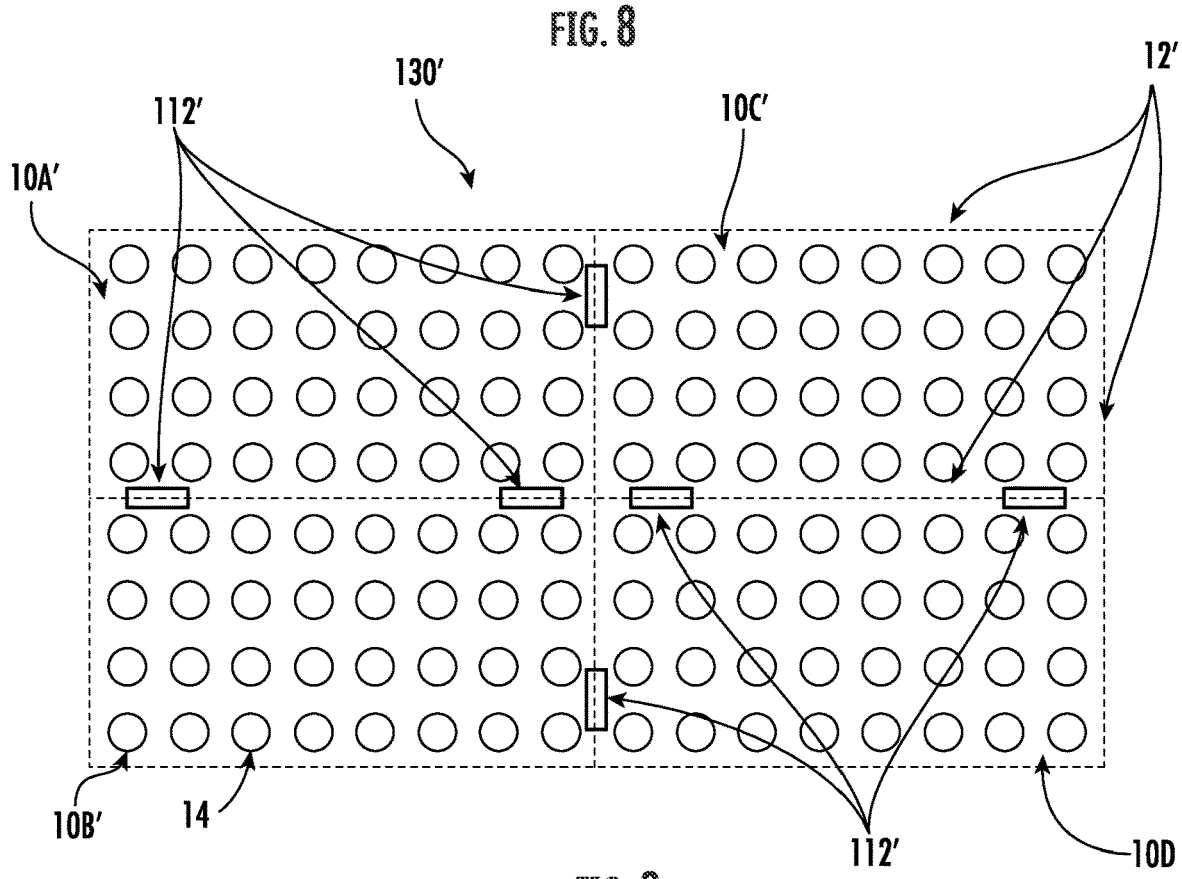
FIG. 9 depicts an example glass sheet for singulating a plurality of lens array substrates as shown in FIG. 8 according to one or more embodiments described and illustrated herein.

The datum notches 112A-112C are formed prior to dicing of a glass sheet into individual optical substrates, such as individual lens array substrates or individual fiber hole array substrates. FIG. 9 illustrates an example glass sheet 130' where a series of rectangles 112' are formed along the dicing line 19 between individual lens array substrates 10A', 10B', 10C', and 10D. The rectangles 112' are formed by a laser process. The two opposite sidewalls of the rectangle that are parallel to the boundary line are fabricated at a precise distance offset from the lens array 14. These two opposite sidewalls are spaced apart by a distance that is greater than the dicing saw kerf plus a margin for uncertainty due to saw alignment to the boundary. An example sidewall spacing would be 0.5-1.0 mm.

Figure 10:
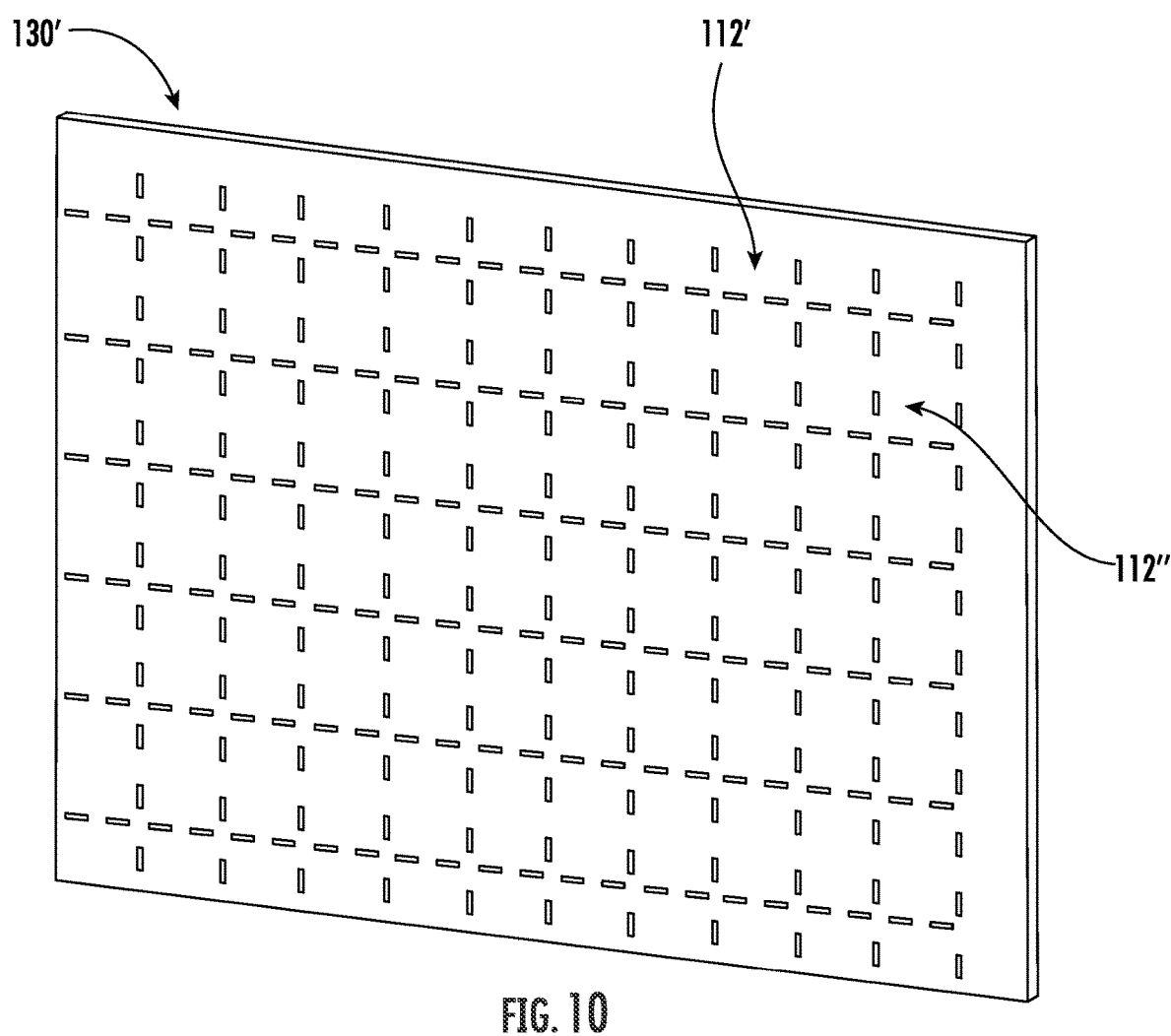
FIG. 10 depicts a perspective view of the example glass sheet of FIG. 9 after a laser damage and etch process according to one or more embodiments described and illustrated herein.
Figure 11:
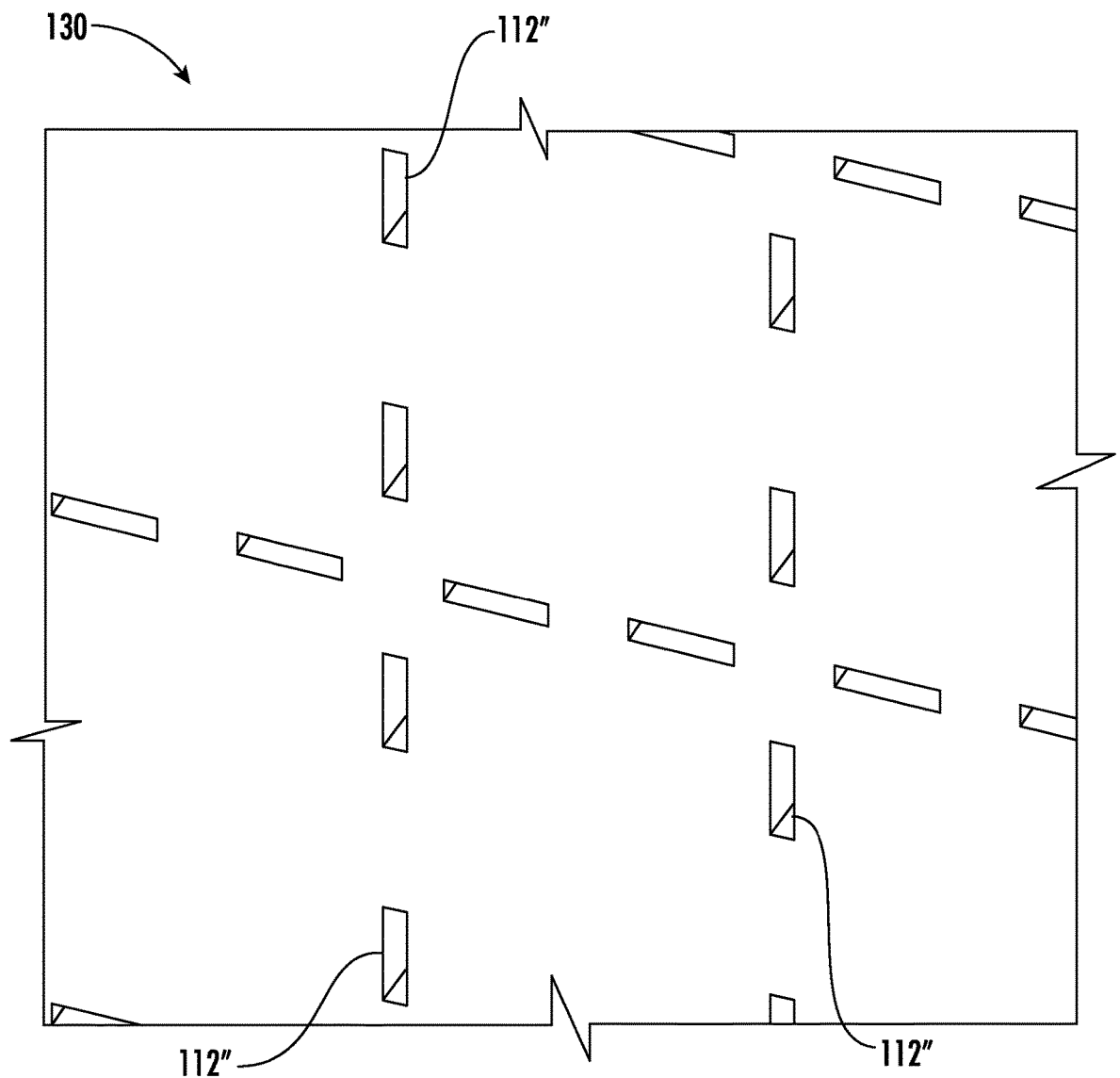
FIG. 11 depicts a close-up view of the example glass sheet of FIG. 10 according to one or more embodiments described and illustrated herein.

An etching process then causes rectangular openings 112" to form as the interior rectangular plug pieces (not shown) are released from the glass sheet 130'. FIGS. 10 and 11 provide isometric views of a glass sheet 130" after the etching process and the formation of the rectangular openings 112". It is noted that the lens array 14 is illustrated only the bottom left corner of FIG. 10 for ease of illustration.

Figure 12:
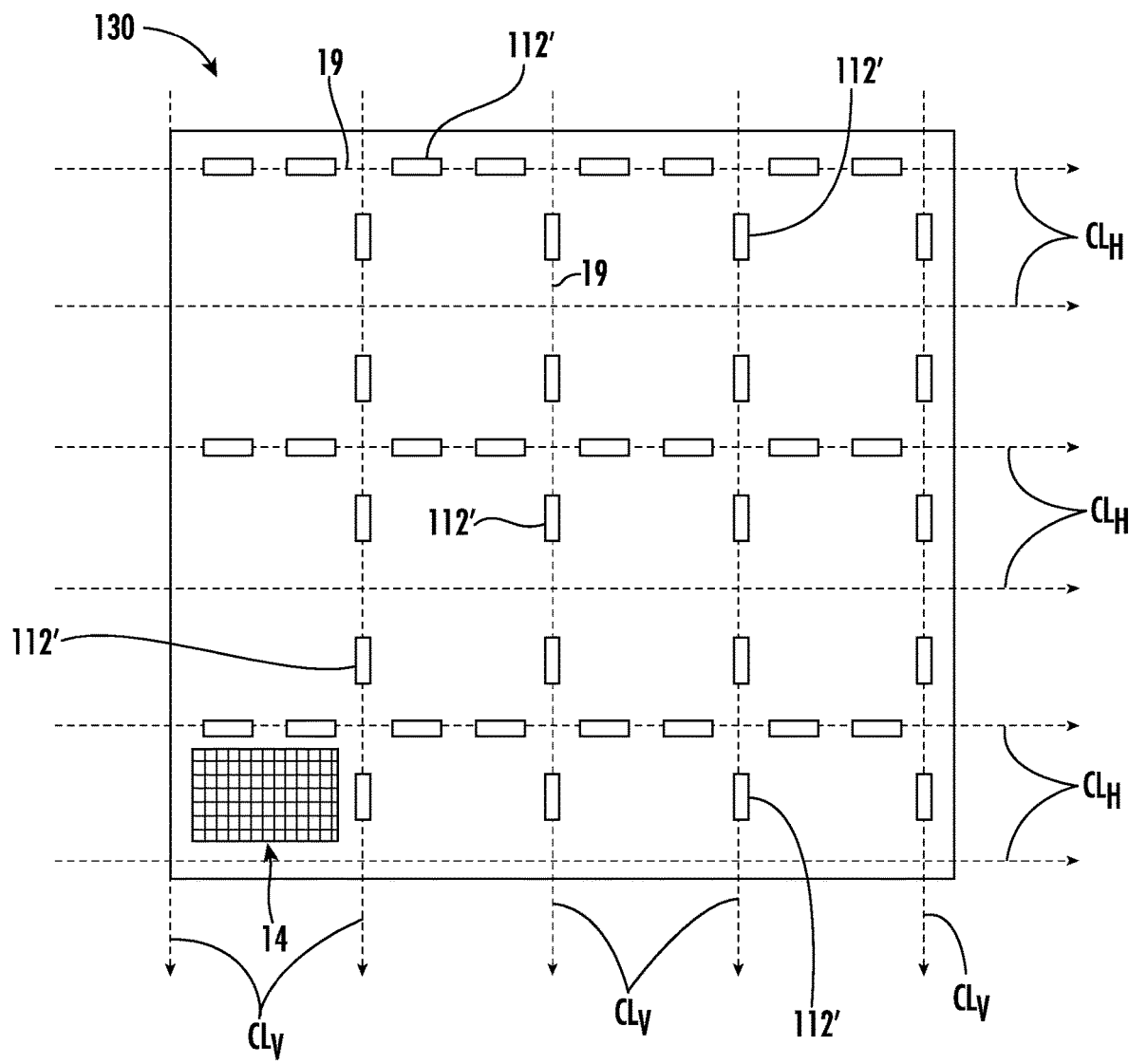
FIG. 12 depicts a dicing process to singulate the glass sheet depicted by FIG. 9 according to one or more embodiments described and illustrated herein.

After the rectangular openings 112" are formed, the glass sheet 130' is diced into individual lens array substrates 10' using a dicing saw or other dicing tool. FIG. 12 illustrates the path of the dicing saw along the dicing lines 19 as indicated by vertical cut arrows $CL_V$ and horizontal cut arrows $CL_H$ such that each laser-formed rectangular opening 112" is cut in two. Thus, as shown in FIG. 8, the resulting lens array substrates 10' have non-precision edges 12' with three datum notches 112A, 112B, and 112C.

Figure 13:
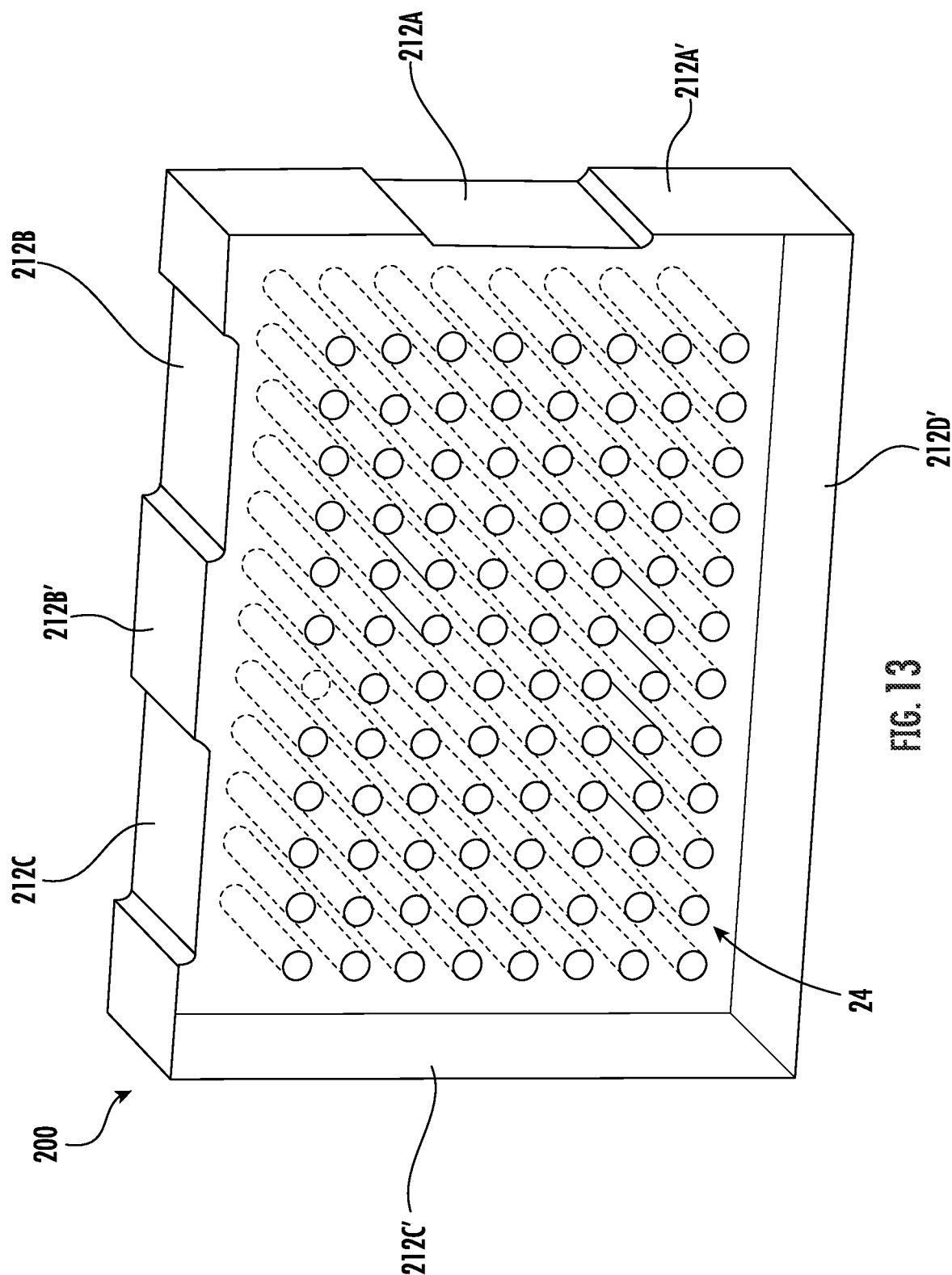
FIG. 13 depicts a perspective view of an example fiber hole array substrate having negative alignment features according to one or more embodiments described and illustrated herein.

As stated above, the precision edge datum process can also be applied to fiber hole array substrates 200 that provide arrays of fiber alignment holes 24. FIG. 13 depicts a fiber hole array substrate 200 after dicing, where the datum notches 212A, 212B, and 212C on the perimeter of the substrate (defined by non-precision edges 212A', 212B', 212C' and 212D') are precisely aligned relative to the fiber hole array 24.

Figure 14:
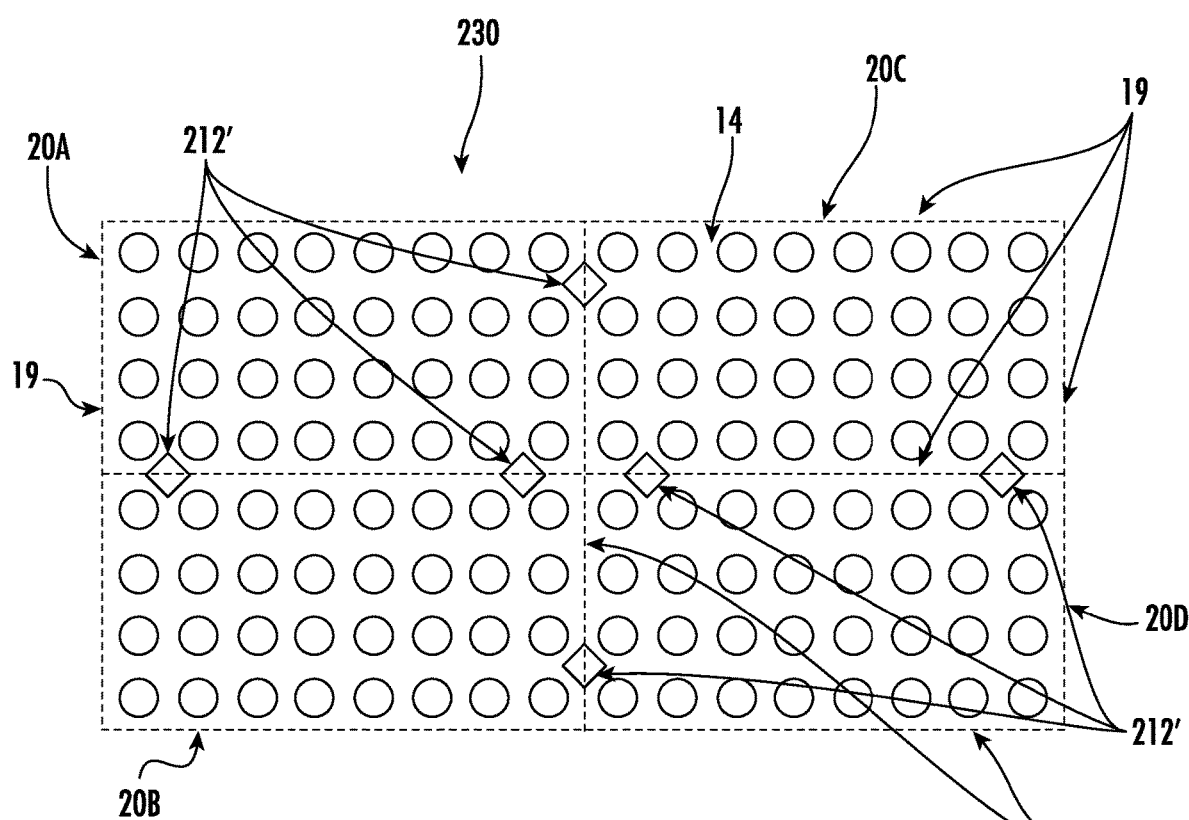
FIG. 14 depicts an example glass sheet for singulating a plurality of lens array substrates having V-shaped negative alignment features according to one or more embodiments described and illustrated herein.
Figure 15:
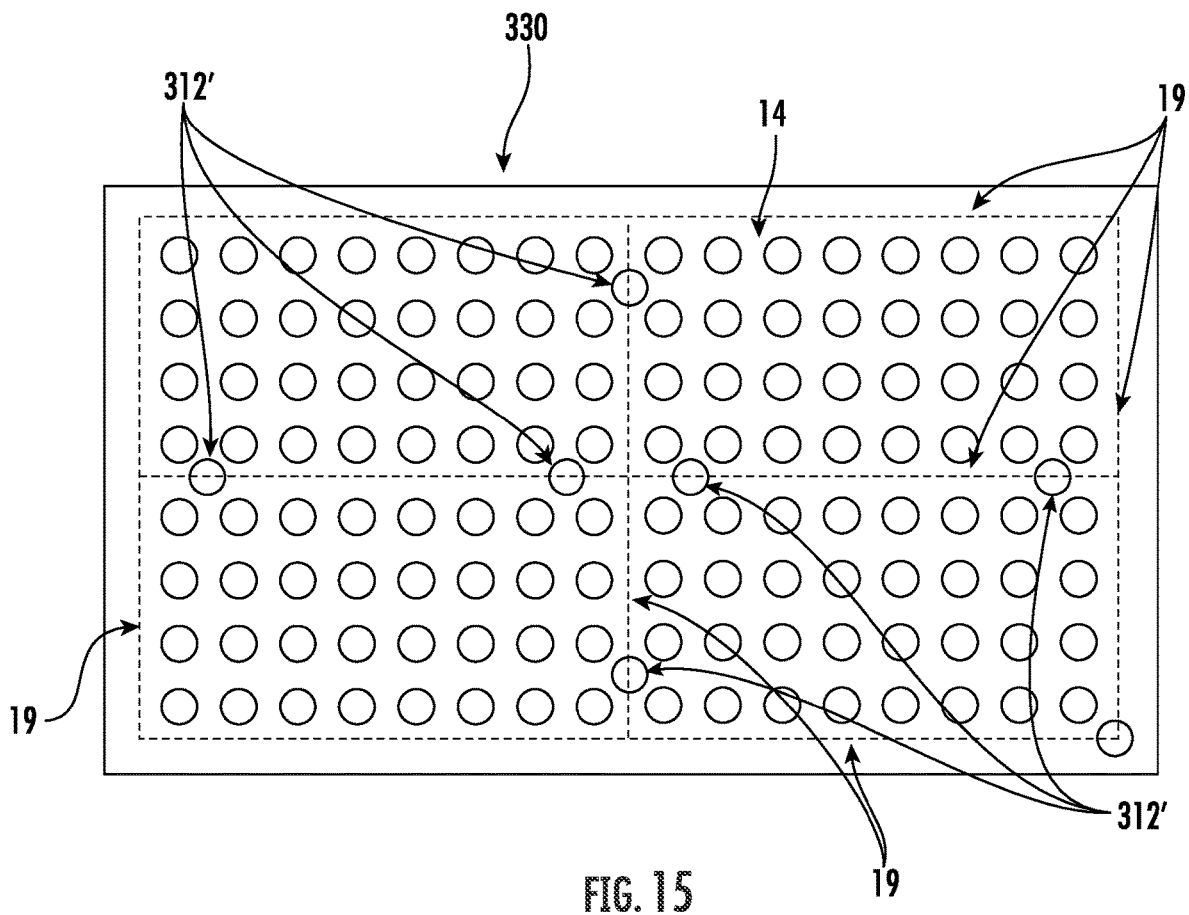
FIG. 15 depicts an example glass sheet for singulating a plurality of lens array substrates having semi-circular negative alignment features according to one or more embodiments described and illustrated herein.

The laser damage and etch process described herein enables fabrication of datum notches with other shapes. FIG. 14 illustrates a glass sheet 230 and how V-shaped datum notches may be formed by dicing through diamond-shaped etch regions 212'. FIG. 15 illustrates a glass sheet 330 and how semi-circular datum notches are formed by dicing through circular etch regions 312'. It should be understood that datum notches having other shapes are also possible.

Figure 16:
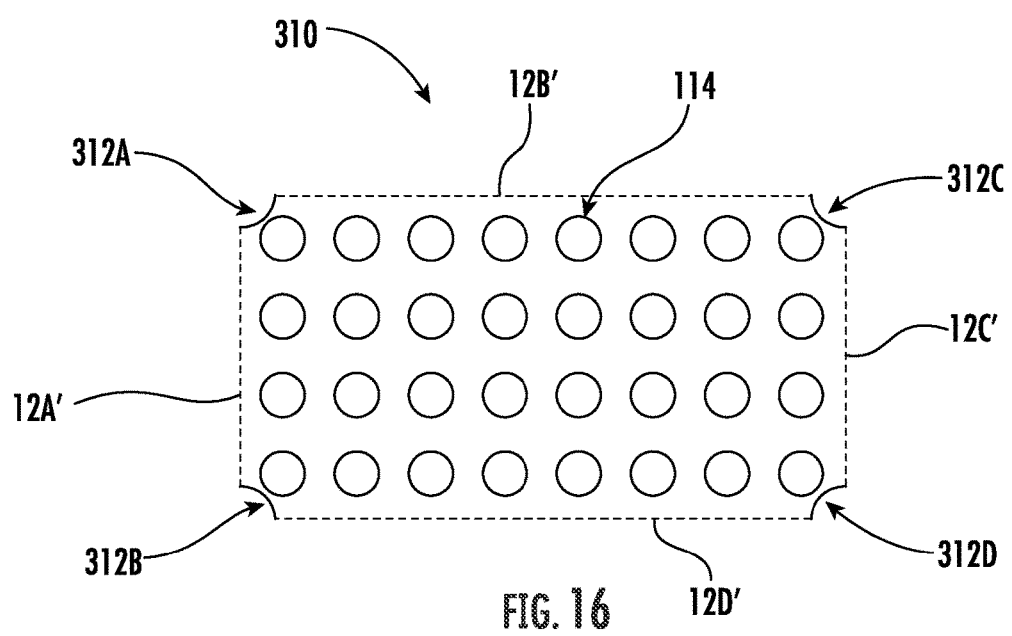
FIG. 16 depicts an example glass sheet for singulating a plurality of lens array substrates having quarter-circle negative alignment features according to one or more embodiments described and illustrated herein.

Other locations on the lens array substrate or fiber hole array substrate for the datum notches are also possible. FIG. 16 illustrates a lens array substrate 310 having datum notches 312A-312D configured as quarter-circle notches at each corner of the lens array substrate 310. The datum notches 312A-312D are formed using the precision laser process described above. The example lens array substrate 310 has non-precision edges 12A'-12D' as described above. Thus, only the datum notches 312A-312D contribute to the precision alignment of the lens array substrate 310 to another optical component, such as a ferrule end face or a fiber hole array substrate, for example.

Figure 17:
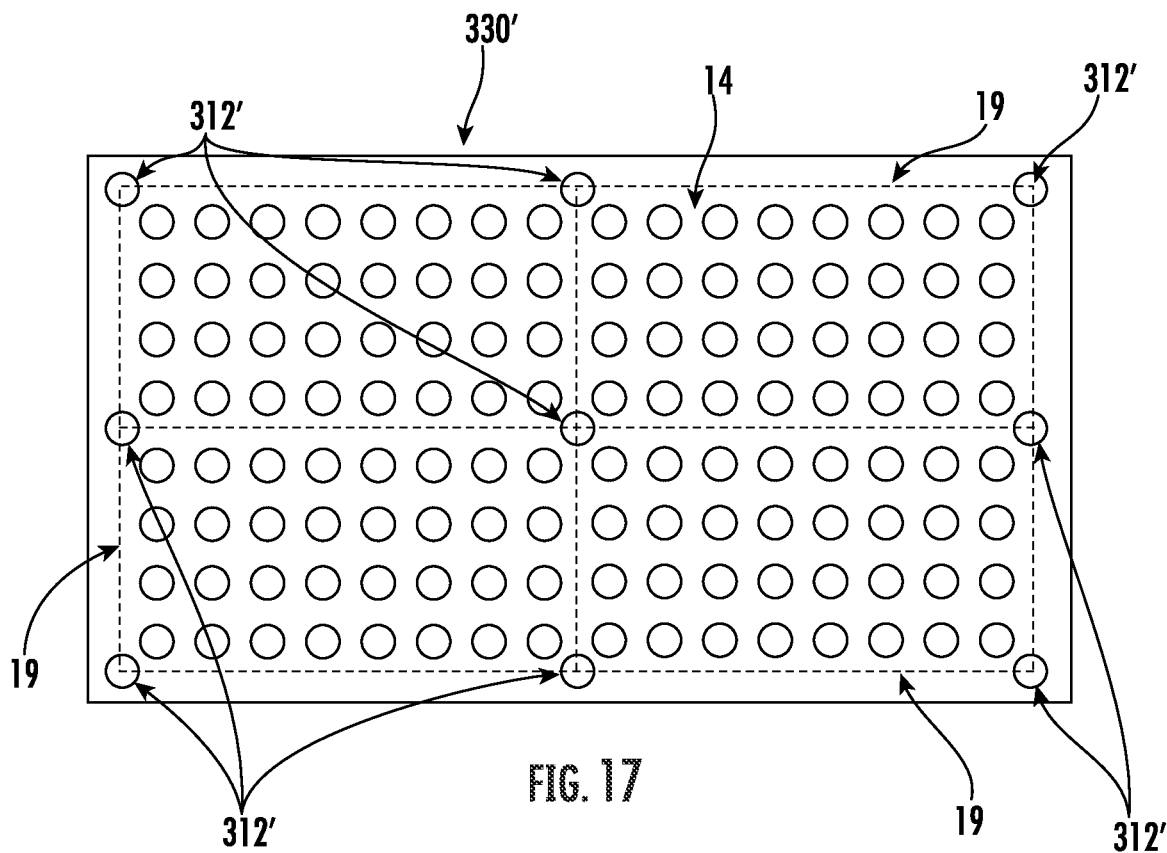
FIG. 17 depicts an example lens array substrate having a quarter-circle negative alignment feature at each corner
Figure 18:
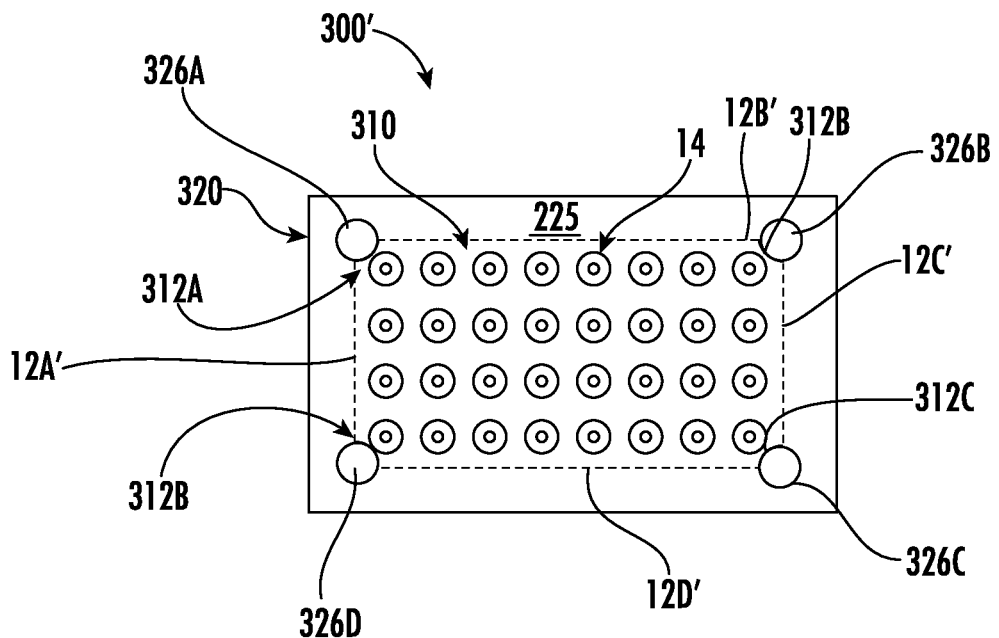
FIG. 18 depicts the lens array substrate of FIG. 17 coupled to an example ferrule end face

FIG. 17 illustrates an example glass sheet 330' that may be used to form the example lens array substrate 310 shown by FIG. 16. Precision laser circles are formed at the intersections of the dicing lines 19. After etching, circular openings are formed and the glass sheet 330' is then diced along the dicing lines and through the circular openings by a dicing saw to form the lens array substrate 310 of FIG. 16 having datum notches 312A-312D configured as quarter-circles.

After dicing, individual lens array substrates 310 may be disposed on a ferrule end face 325 of a ferrule 320 and passively aligned to a fiber hole array (not shown) by alignment features configured as circular alignment posts 326A-326D. As stated above with respect to FIG. 4, the alignment posts 326A-326D may be integral to the ferrule end face 325, or added as separate components. The cooperation between the datum notches 312A-312D and the circular alignment posts 326A-326D align the lens array 14 of the lens array substrate 310 to the fiber hole array at the ferrule end face 325.

Figure 19:
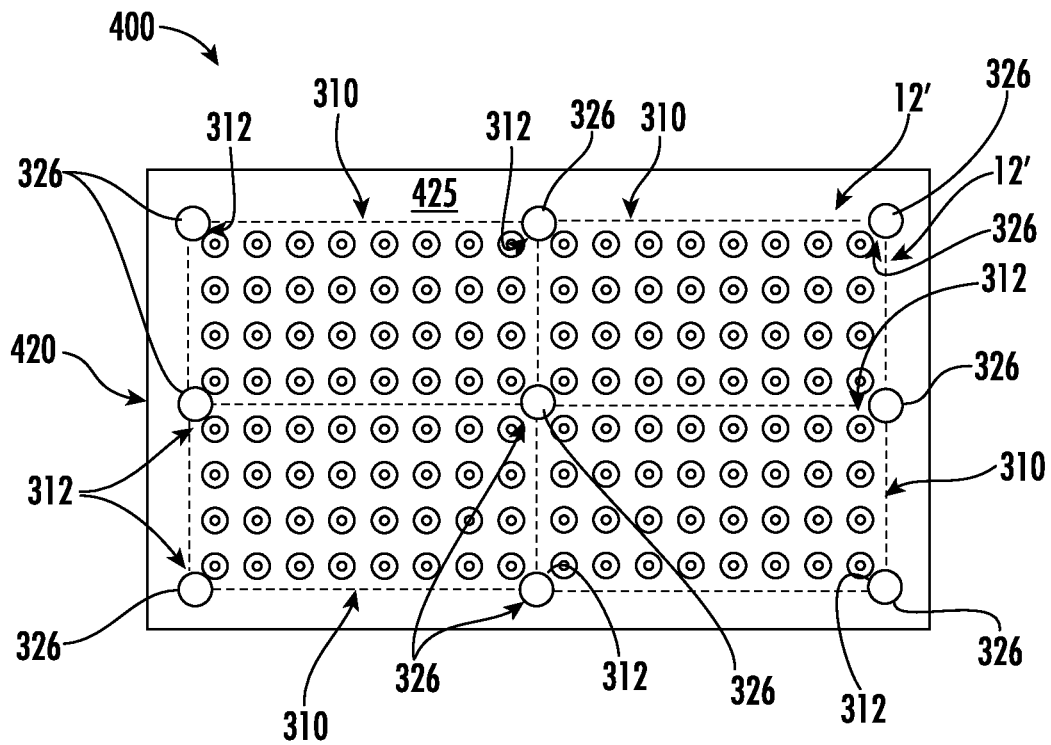
FIG. 19 depicts an example array of lens array substrates as shown by FIG. 17 coupled to an example ferrule end face according to one or more embodiments described and illustrated herein.

In all the embodiments described herein, the glass-based optical substrates (e.g., lens array substrates) may be ganged together on a common ferrule end face. FIG. 19 illustrates an example lens-based connector assembly comprising an array of lens array substrates 310 ganged together on a ferrule end face 425 of a ferule 420. A plurality of circular alignment posts 326 contact a plurality of datum notches 312 of the array of lens array substrates 326. The center circular alignment post 326 contacts a corner datum notch 312 of each lens array substrate 310 such that it is surrounded by four corner datum notches 312. Only the corner datum notches 312 contribute to alignment because the non-precision edges 12' of the lens array substrates 310 do not contact one another or the circular alignment posts 326.

Figure 20:
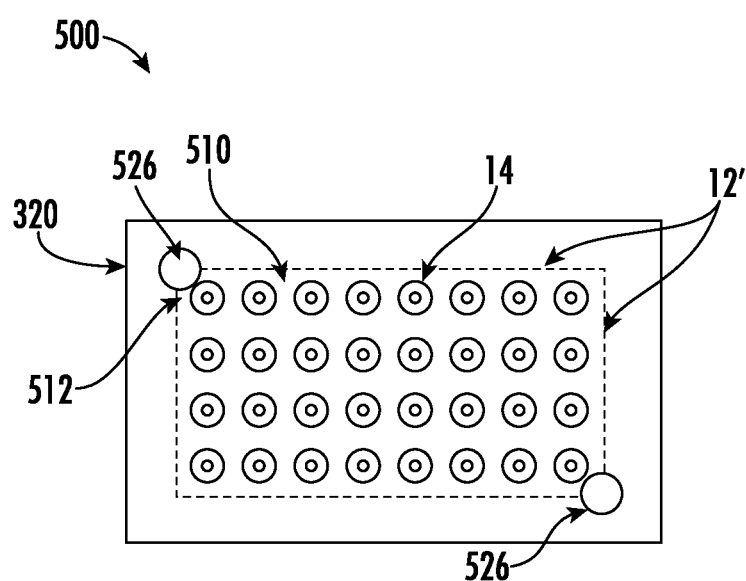
FIG. 20 depicts an example lens array substrate having a quarter-circle negative alignment feature at two diagonally opposing corners according to one or more embodiments described and illustrated herein.

Other locations for the datum notches are also possible. In a similar approach, FIG. 20 illustrates that as few as two corner notch datum features 512 may be used to passively align the lens array substrate 510 to the ferrule fiber alignment holes (not shown) on a ferrule end face 525 of a ferrule 520. A quarter-circle notch is located at a first corner and a second corner that is diagonally opposite from the first corner. Two 526 alignment posts may be used to accurately position the lens array substrate 510 and hold it in place during UV adhesive curing.

Some of the alignment features described above are configured as negative alignment features in that they extend into a non-precision edge of the glass-based optical substrates. However, another approach for fabricating alignment features involves formation of positive alignment features that extend away from a non-precision edge.

Figure 21:
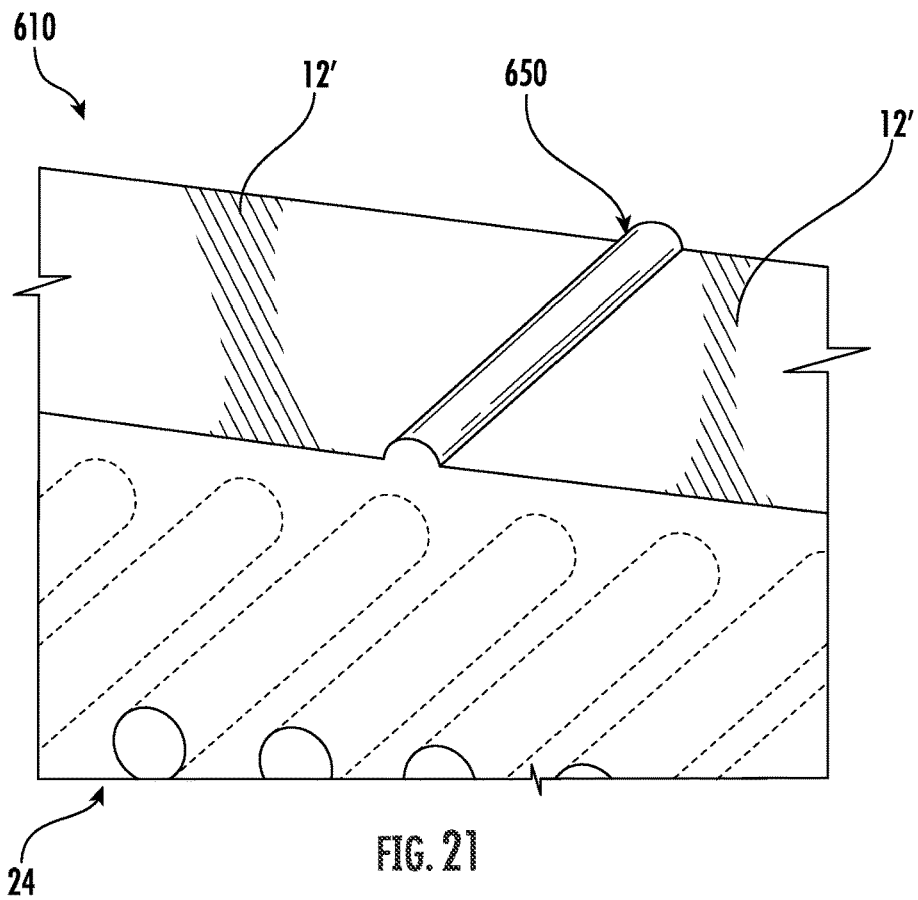
FIG. 21 depicts an example fiber hole array substrate having a positive alignment feature according to one or more embodiments described and illustrated herein.

FIG. 21 illustrates an example glass-based optical substrate comprising a fiber hole array substrate 610 having a positive alignment feature configured as a raised ridge datum feature 560 that is formed using a precise laser damage and etch processes. As described in more detail below, the ridge datum features 650 may be configured to mate with precision negative features of a separate optical component, such as a molded ferrule body, for example. The example ridge datum feature is defined by a positive semi-circular protrusion. The positive alignment features may take on other shapes, such as a rectangular protrusion, for example. It should be understood that the positive alignment features described herein may also be formed in other glass-based optical substrates, such as lens array substrates.

The edge surfaces adjacent to the ridge datum feature 650 may also be formed using laser damage and etch processes, but slow write times may make this approach expensive. Thus, in some embodiments, the edge surface surrounding the ridge datum feature 650 is a non-precision edge 12' formed by using a more rapid low cost fabrication process (e.g., laser cutting or score and break processes). These processes can be selectively applied at locations along the substrate edge, such as to the left and right of each positive alignment feature, (e.g., a ridge datum feature 650) while avoiding any damage to the positive alignment feature itself. While these processes may provide a less precise edge surface, they are acceptable as long as the highest point along the adjacent edge surface is lower than the height of the positive alignment feature. Substrate dicing using a dicing saw may not be possible because in forming the adjacent edge surfaces the saw blade would cut through the project datum feature.

Figure 22:
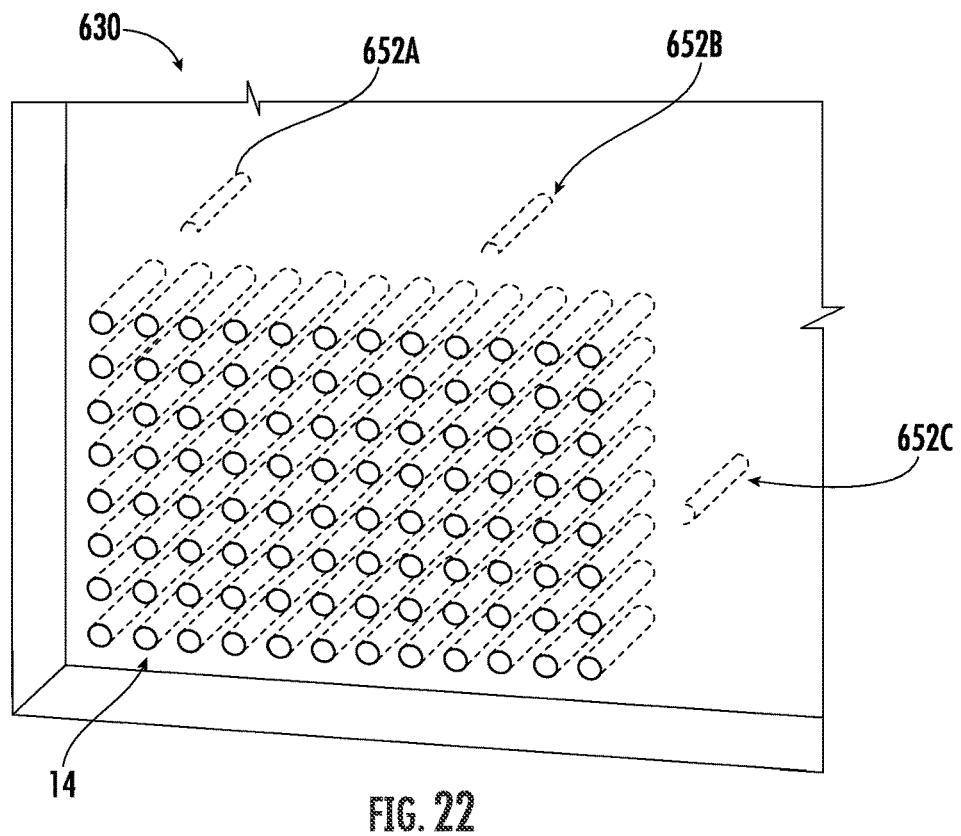
FIG. 22 depicts a perspective an example glass sheet for forming a fiber hole array substrate having an opening for forming the positive alignment feature of FIG. 21 according to one or more embodiments described and illustrated herein.
Figure 23:
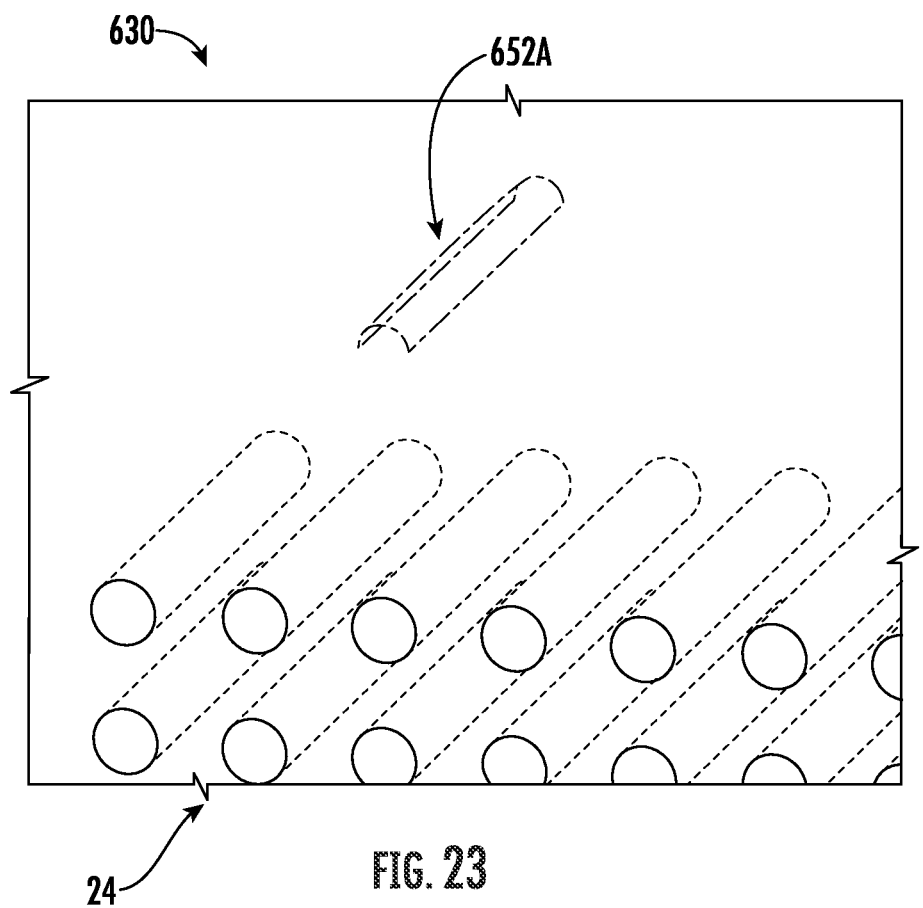
FIG. 23 depicts another perspective view of the glass sheet of FIG. 22 according to one or more embodiments described and illustrated herein.

FIGS. 22 and 23 depict a rapid low-cost fabrication process for forming positive alignment features, such as the ridge datum feature illustrated in FIG. 21. FIG. 22 is a partial view of a glass sheet 630 for forming multiple fiber hole array substrates 610. FIG. 23 is a close-up view of the glass sheet 630 shown in FIG. 22.

First, one or more semicircular shape openings 652A 652B, 652C are formed through the thickness of the glass sheet 630 by a precision laser process, such as the precision laser damage and etch process described above. These semicircular shape openings 652A, 652B, 652C are offset from a fiber hole array 24 (or a lens array) by a precise offset distance. This offset distance may be selected so that the resulting positive alignment feature will fall on the boundary line between substrates after fabrication. The width of the semicircular shape openings 652A, 652B, 652C used to form the ridge datum features 650 can be selected to closely match the gap created between fiber hole array substrates 610 by the selected separation process (e.g., laser cleaving or score and break processes). This ensures that after separation, the convex low portion of the lower datum feature can make contact with and align to the concave upper portion.

Figure 24:
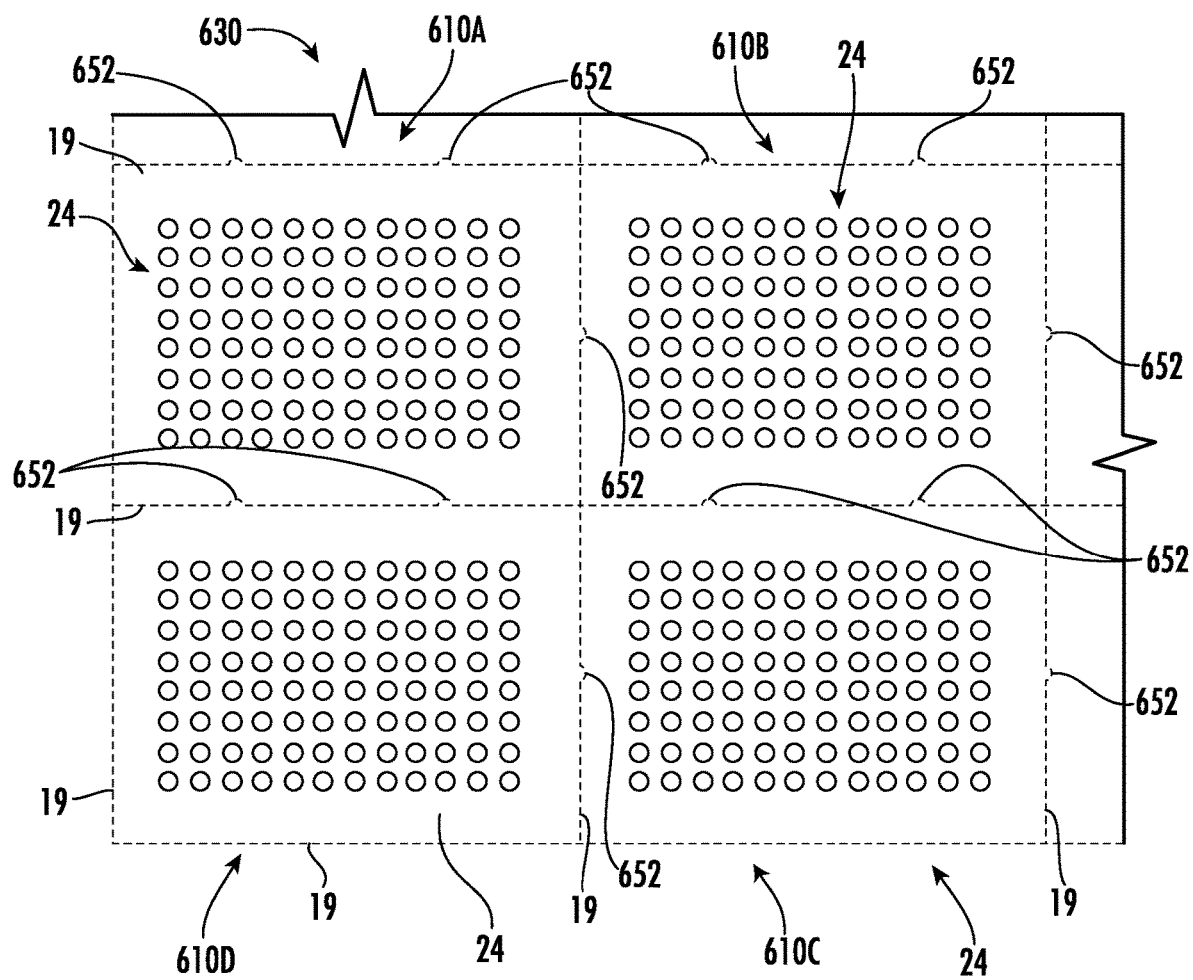
FIG. 24 depicts a front view of a glass sheet of the glass sheet of FIGS. 22 and 23 according to one or more embodiments described and illustrated herein.

Second, in the next step as shown in FIG. 24, the substrate separation process (e.g., laser cleaving or score and break cleaving) is applied along the dicing lines 19 that separate and extend around individual fiber hole array substrates 610A, 610B, 610C, and 610D. The implement used to separate the fiber hole array substrates 610A-610D does not pass through the semicircular shape openings 652. Any substrate separation process may be employed so long as the precision positive alignment features (e.g., ridge datum features 650) remain after separation.

Figure 25:
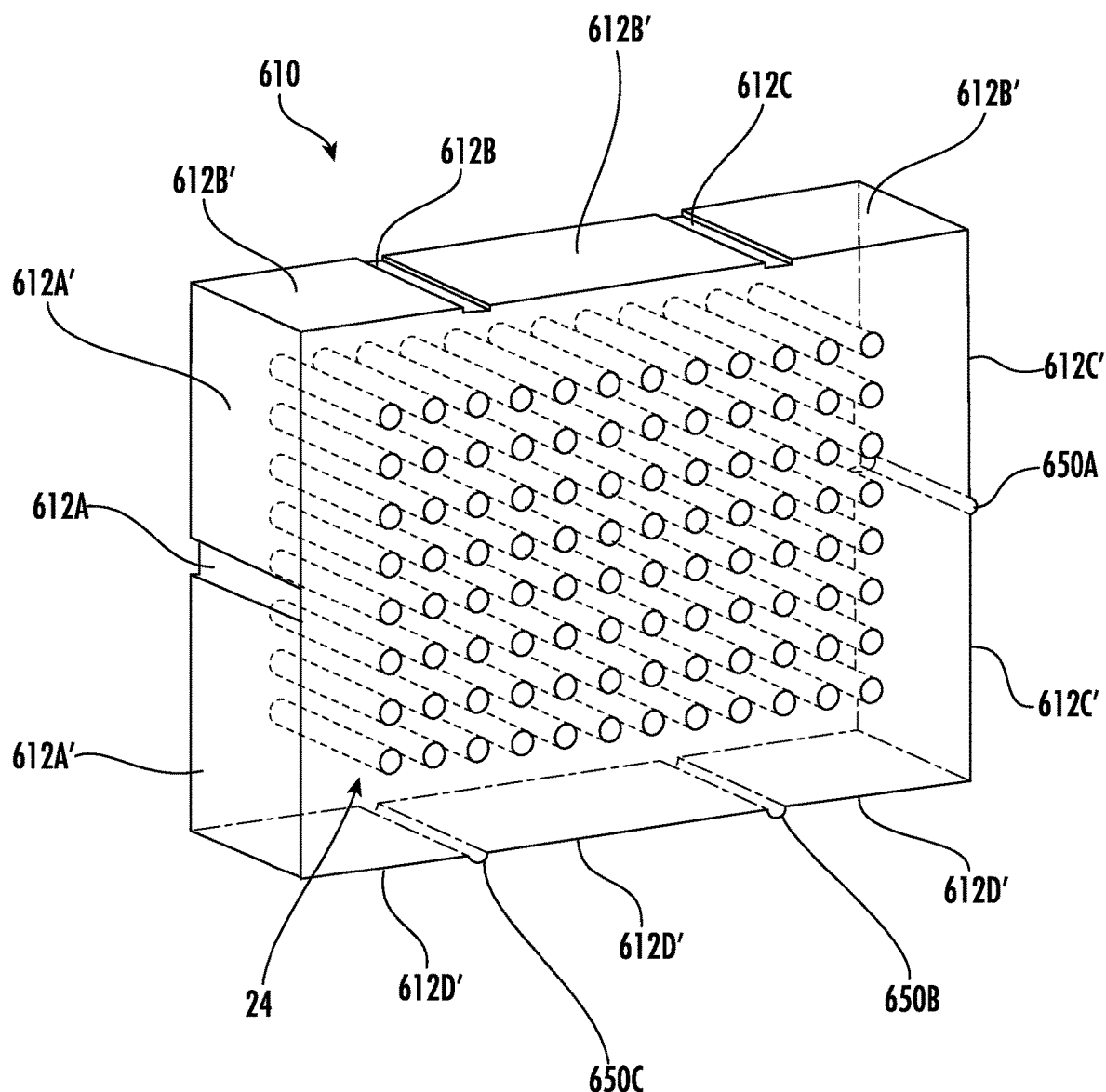
FIG. 25 depicts a perspective view of an example fiber hole array substrate having both positive and negative alignment features according to one or more embodiments described and illustrated herein.

FIG. 25 illustrates an example fiber hole array substrate 610 after the one or more separation processes are complete. The example fiber hole array substrate 610 of FIG. 25 has both datum notches 612A, 612B, and 612C (i.e., negative alignment features) and mating ridge datum features 650A, 650B, and 650C. In the illustrated embodiment the datum notches 612A, 612B, 612C have a flat surface instead of the concave surface shown in FIGS. 21-23. The flat surfaces may be generated by changing the shape of the openings 652A-652C. However, it should be understood that embodiments may have circular datum notches and/or rectangular ridge datum features in any combination.

To reduce laser processing time, the fiber hole array substrate 610 may be made using a thin sheet of glass. For example, the fiber hole array substrate 610 could be, without limitation, 200-300 μm thick. Since the hole array substrate may be mounted on a supporting surface, such as a ferrule end face, it does not need to be particularly stiff, thereby enabling thin sheet solutions.

Figure 26:
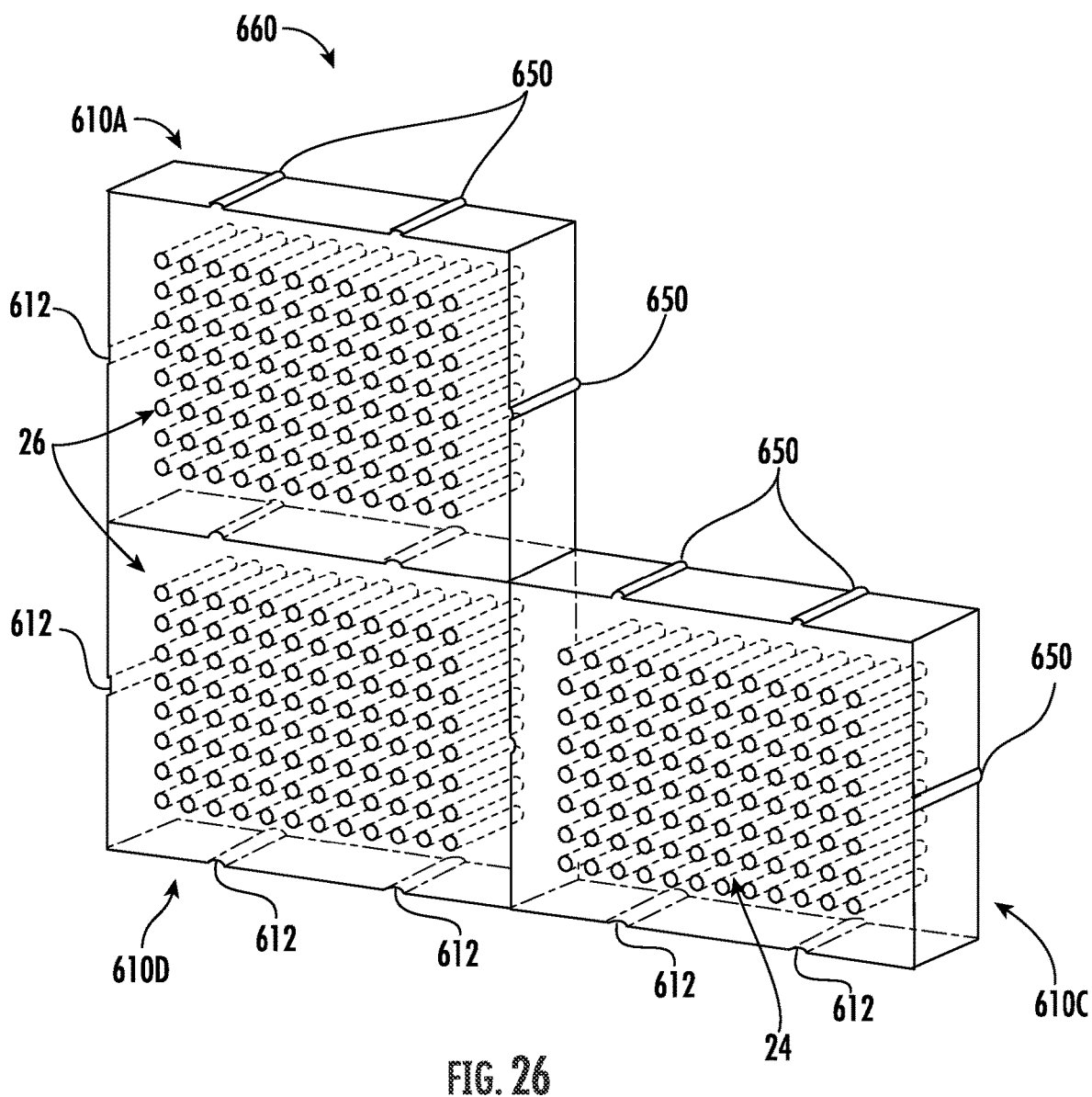
FIG. 26 depicts a perspective view of an example partial array of the fiber hole array substrate of FIG. 25 according to one or more embodiments described and illustrated herein.
Figure 27:
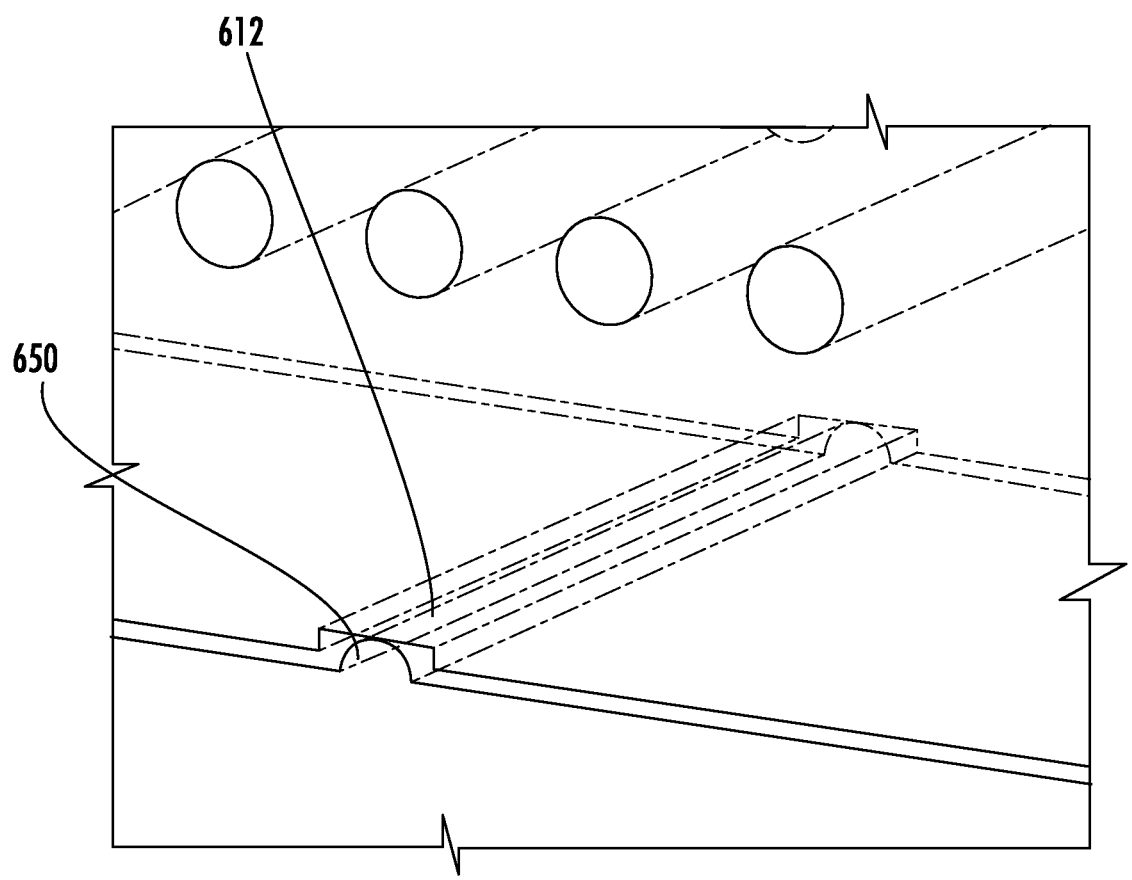
FIG. 27 depicts a close-up view of the example partial array of fiber hole array substrates showing a positive alignment feature mating with a negative alignment feature according to one or more embodiments described and illustrated herein.

Multiple fiber hole array substrates with laser-formed positive and negative alignment features may be tiled or tessellated to form larger arrays that could be impractical to fabricate at high yield. A partially assembled example of an array of fiber hole array substrate 660 is shown in FIG. 26, where the positive ridge datum features 650 on one fiber hole array substrate 610A-610D (610B is not shown in this partially assembled view) contact the datum notches 612 on neighboring fiber hole array substrates 610A-610D. FIG. 27 is a close-up view illustrating the mating between an individual ridge datum feature 650 and a corresponding datum notch 612. Using this approach, large arrays of fiber holes can be assembled, where the hole centers are all precisely aligned to each other across the multiple fiber hole arrays.

Figure 28:
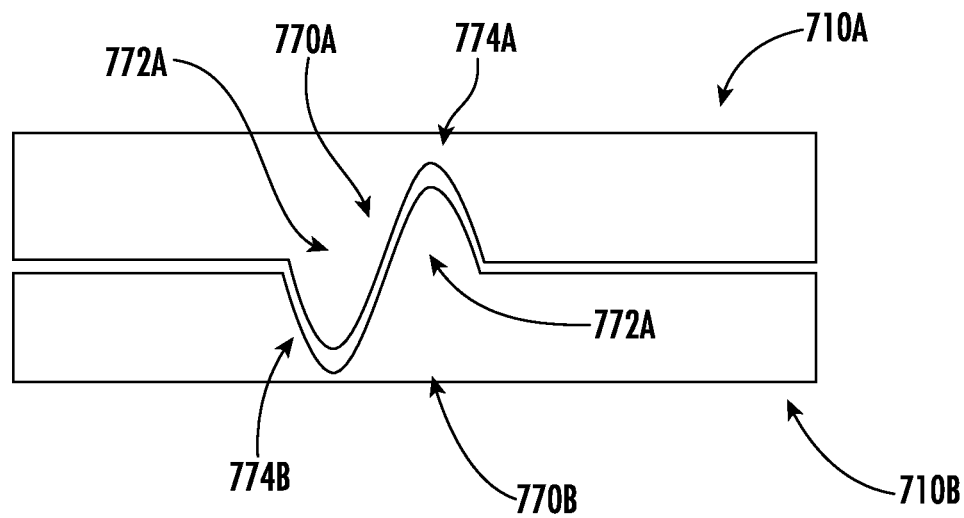
FIG. 28 depicts mating sinusoidal alignment features according to one or more embodiments described and illustrated herein.
Figure 29:
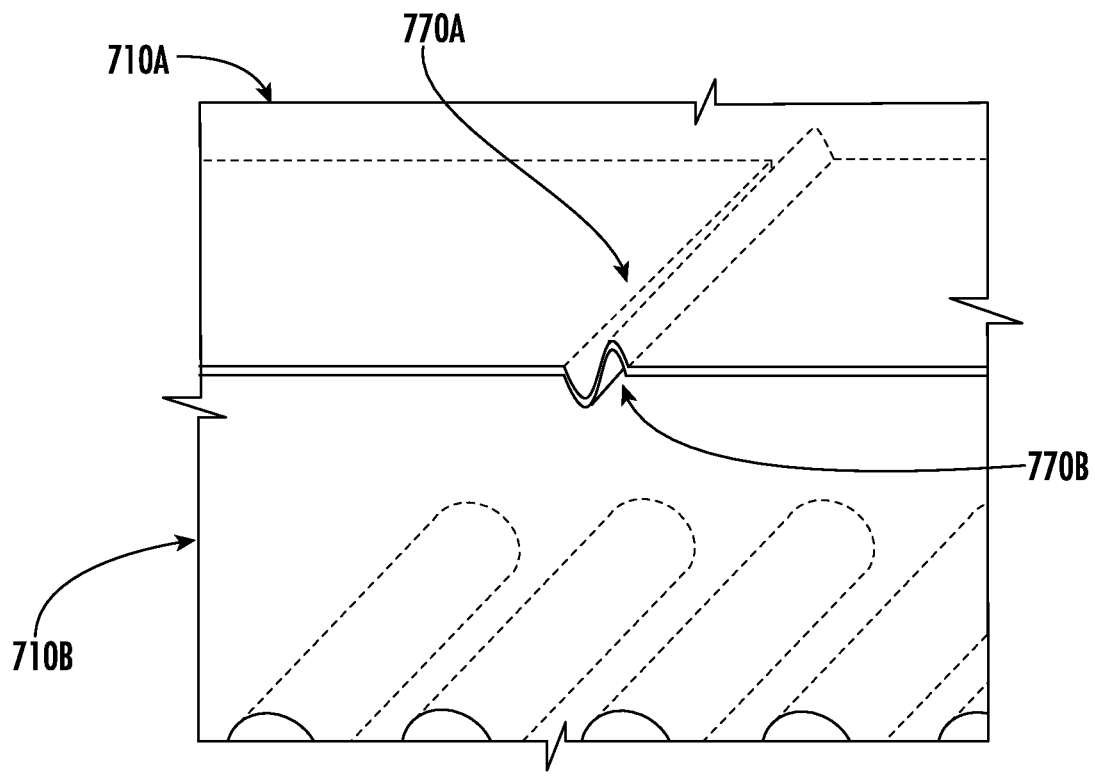
FIG. 29 depicts a perspective view of mating sinusoidal alignment features according to one or more embodiments described and illustrated herein.

The laser damage and etch process can also be used to create alignment features that simultaneously provide both positive and negative features (e.g., both projections and notches). FIG. 28 illustrates an example first fiber hole array substrate 710A having a first sinusoidal alignment feature 770A comprising projection 772A defining a positive alignment feature and a recess 774A defining a negative alignment feature. The first sinusoidal alignment feature mates with a corresponding second sinusoidal alignment feature 770B of a second fiber hole array substrate 710B having a projection 772A and a recess 774B. FIG. 29 is a close-up perspective view of mating first and second sinusoidal alignment features 770A, 770B. The symmetry of the sinusoidal alignment feature allows it to be used at any location around the edges of the glass-based optical substrate, where it can mate in a hermaphroditic mode with a similar feature on another glass-based optical substrate or ferrule. This provides flexibility in the design of scalable systems that may be arranged in different ways for different channel count applications, without the need for concern regarding mating positive and negative alignment features described above.

These sinusoidal alignment features provide a relatively long angled surface that helps provide lateral alignment (in the direction parallel to the substrate edge) of two mated glass-based optical substrates. While other alignment feature can provide these long angled surfaces, they do so by increasing the projection distance of the projection away from the edge. These larger projections may be weaker and more likely to fail under lateral loading. The sinusoidal alignment feature provides an advantage by being more well-supported and less likely to fail in assembly while providing comparable lateral alignment tolerances during assembly and mating.

Figure 30:
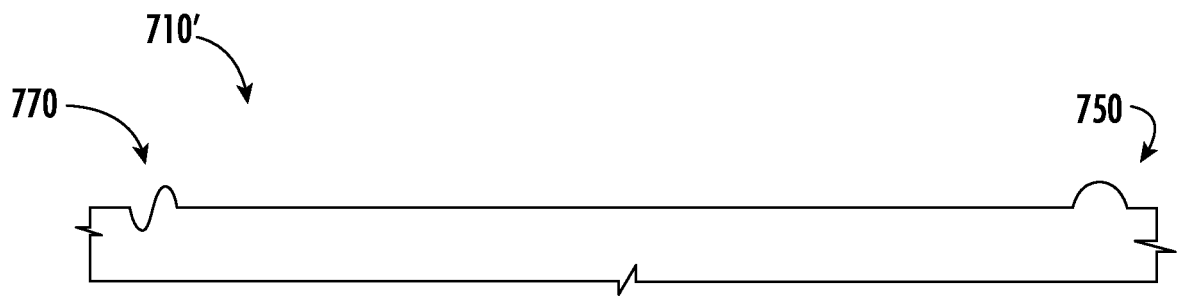
FIG. 30 depicts a partial view of an example glass-based optical substrate having a sinusoidal alignment feature and a positive alignment feature according to one or more embodiments described and illustrated herein.

If needed, both sinusoidal and other positive and/or negative alignment features can be incorporated along a common edge. FIG. 30 shown an example wherein both a sinusoidal alignment feature 770 and a positive ridge datum feature 750 is on the same edge.

The specific case of interleaved alignment features in which laser inscription simultaneously writes positive or projecting alignment features on two adjacent cells on the wafer has the advantage that the number of individual interrupted singulation lines required for part separation is reduced. Where a surface is common to two interleaved alignment features a single interruption to the line of laser singulation (the most likely process for positive geometries) liberates two alignment features rather than just one as is the case with discrete isolated single alignment features.

Figures 31A, 31B:
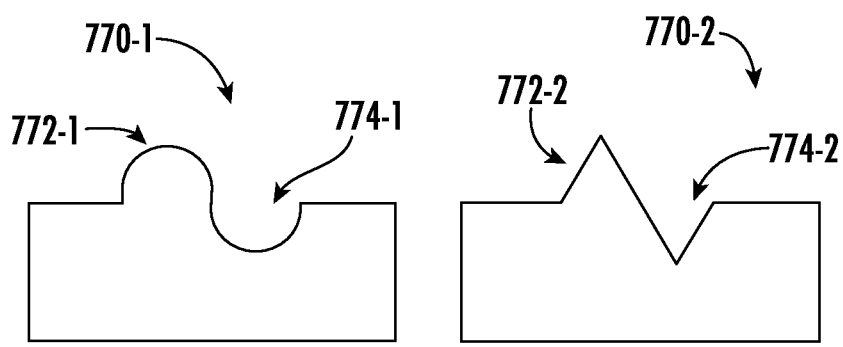
FIGS. 31A-31D depict example alignment features that have both a positive alignment feature and a negative alignment feature according to one or more embodiments described and illustrated herein.
Figures 31C, 31D:
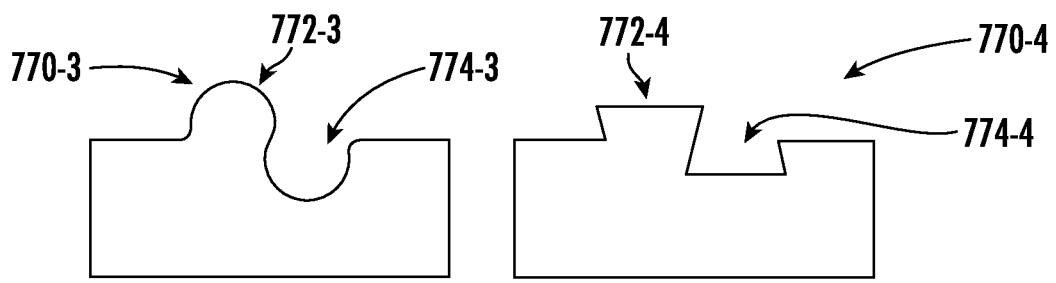

The sinusoidal alignment feature is one member of an infinite class of alignment features that can tessellate with one another to provide precise alignment of mated substrates. FIGS. 31A-31D provide several examples of alignment features providing both positive and negative alignment features. FIG. 31A illustrates an alignment feature 770-1 including a circular positive feature 772-1 and a circular negative feature 774-1. FIG. 31B illustrates an alignment feature defining a V-groove-like datum having a triangular positive feature 772-2 and a triangular negative feature 774-2. In other examples the alignment features can be made to interlock with each other using dual dovetail-like joint designs. FIG. 31C illustrates a dovetail alignment feature 770-3 having a curved positive feature 772-3 and a curved negative feature 774-3. FIG. 31D illustrates a dovetail alignment feature 770-4 having a wedged positive alignment feature 772-4 and a wedged negative alignment feature 774-4.

Because the laser damage and etch process can create features that vary in width moving in a direction normal to the substrate, it is also possible to fabricate interlocking dovetail joints where the tongue and groove elements are tapered or wedged. This allows substrates to be locked together after mating with minimal lateral play arising from the finite width of the laser damage and etch region. Dovetail alignment features such as 770-3 and 770-4 can be enlarged near the front and/or back surfaces of the glass substrate to aid in aligning the dovetail alignment features during tiling assembly. The enlarged features operate like funnels or tapers to guide the dovetail alignment features together.

Some efficiency can also be had in the creation of datum surfaces and/or alignment features with a minimum amount of time spent in laser inscription by simultaneously forming surfaces on two adjacent substrates in a single pass. The time spent in making a shared feature is effectively halved as it is shared between the two edges being formed. One way in which this can be accomplished is by nesting together simultaneous positive and negative features on adjacent substrates. That is, it is possible to make a positive feature on one substrate and a negative feature on its neighboring substrate by cutting, for example, three sides of a rectangle, resulting in two precision surfaces on a single pass. This can be refined by adding small curvature at the working end of the feature so as to ensure positive contact of the positive feature against a flat surface when put to use and positive contact of the negative feature against a curved surface when put to use.

It is also possible to make inter-nested substrates such that only part of the useful edge is shared by adjacent substrates. This would be true in the case where the substrates are separated by a sinusoid or any shape where two curves, each convex to the face of one of two adjacent substrates, are joined together. In this case the surfaces which share the time burden of laser processing between them are not the convex bearing surfaces themselves but whatever portion of the connecting line or curve is within the kerf width of the singulation means.

FIG. 32 illustrates an example where a laser damage area 880 is formed partially through the thickness of a glass sheet 830. After laser damage is complete, the glass sheet 830 is then flipped over and temporarily mounted on a support substrate 889 for dicing, as shown in FIG. 33A. A dicing saw is then coarsely aligned to the laser damaged area 880, so that the kerf of the dicing saw extends to the left and right of the laser damaged area 880 by a sufficient margin (e.g., >100 μm). The depth of the saw is set so that it partially cuts into the laser damaged region 880, but does not cut all the way through the glass sheet. A sawed trench 882 coarsely aligned with the laser damaged region 880 results from the cutting operation, as shown in FIG. 33B.

The glass sheet is then removed from the support substrate 889 and etched to remove the laser damaged areas 880, producing a precise laser damaged and etched region 881 as shown in FIG. 33C. This approach produces multiple glass substrates (e.g., lens array substrates and/or fiber hole array substrate), where the edges of the glass substrates are defined by both the laser damage and etch process and the dicing saw process. The laser damage and etch edge provides a precision datum feature for subsequent alignment of neighboring glass substrates. The approach reduces laser write time, since only a portion of the substrate edge needs to be formed using the laser damage process. Alternatively, the process can be carried out by first providing the shallow laser damage, then etching, and then mounting on the temporary support substrate for dicing.

Figure 34:
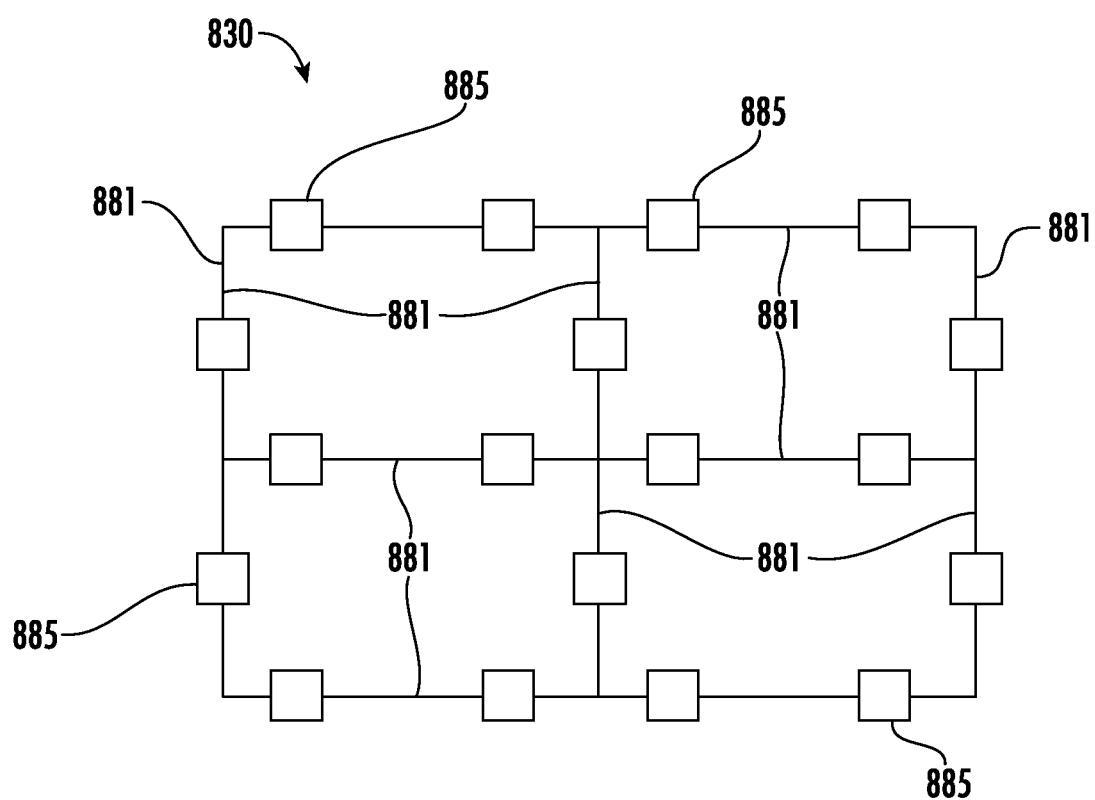
FIG. 34 depicts an example glass sheet to form the glass-based optical substrate of FIG. 33C according to one or more embodiments described and illustrated herein.

Referring now to FIG. 34, the shallow laser damage and edge regions 881 can be provided around the entire perimeter of the glass substrates to be separated from a glass sheet 830. Alternatively, the shallow laser damage and etch process can be applied only in alignment feature regions 885, while remaining edges can be formed using another process, such as laser ablation or score and break processes.

Figure 35:
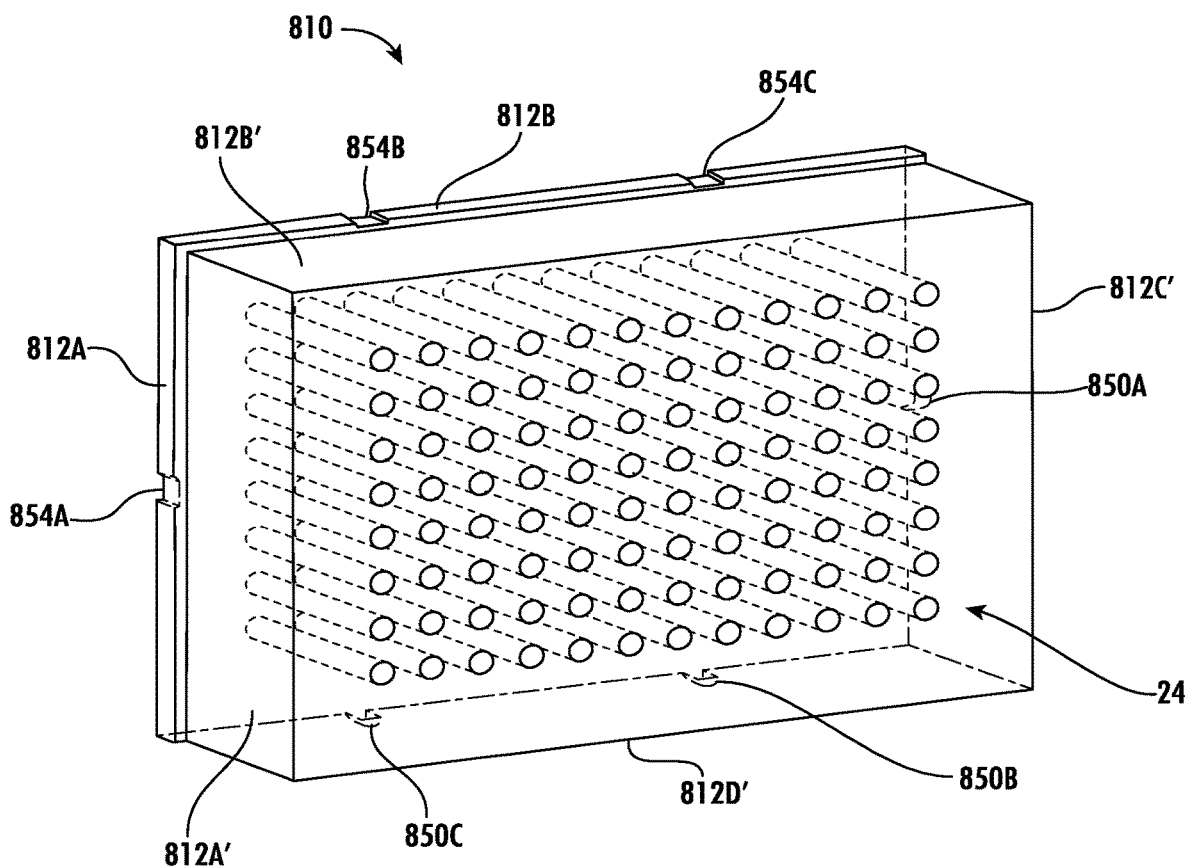
FIG. 35 depicts an example fiber hole array substrate formed by the process of FIGS. 33A-33C according to one or more embodiments described and illustrated herein.
Figure 36:
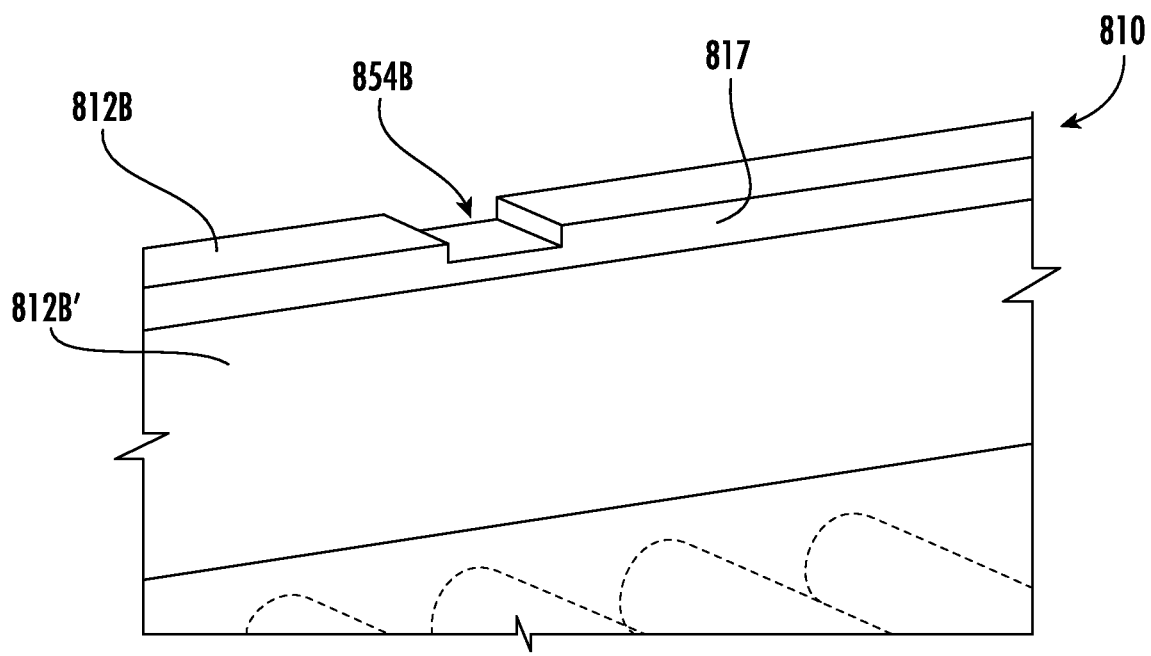
FIG. 36 depicts a close-up view of a negative alignment feature of the fiber hole array substrate of FIG. 35 according to one or more embodiments described and illustrated herein.
Figure 37:
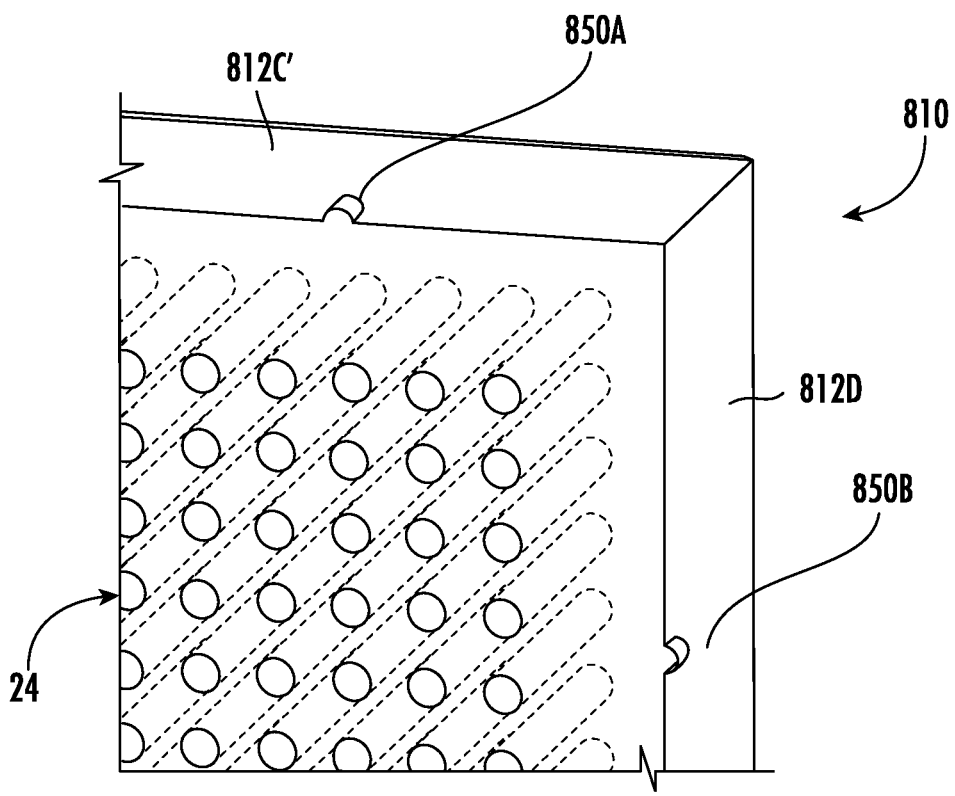
FIG. 37 depicts a close-up view of positive alignment features of the fiber hole array substrate of FIG. 35 according to one or more embodiments described and illustrated herein.

FIG. 35 illustrates an example fiber hole array substrate 810 fabricated using the shallow laser damage and etch process described above with respect to FIGS. 32-34. The fiber hole array substrate 810 includes a fiber hole array 24, a first non-precision edge 812A', a second non-precision edge 812B', a third non-precision edge 812C', and a forth non-precision edge 812D formed by a dicing saw process, for example. The fiber hole array substrate 810 further includes a first precision edge 812A and a second precision edge 812B. The first and second non-precision edges 812A' and 812B' intersect the first and second precision edges 812A and 812B. Because laser damage and etch process is shallow, the first and second precision edges 812A and 812B are defined by a ledge portion 817, as shown in the close-up view of FIG. 36. In the illustrated embodiment, the ledge portion 817 includes negative alignment features configured as first through third datum notches 854A-854C. Positive alignment feature configured as a first ridge datum feature 850A extending from the third non-precision surface 812C', and second and third ridge datums 850B, 850C extending from the fourth non-precision surface 812D' are provided (FIG. 37). As shown in FIG. 37, the ridge datum features 850A-850C of this embodiment do not extend the full length of the respective non-precision surfaces.

Figure 38:
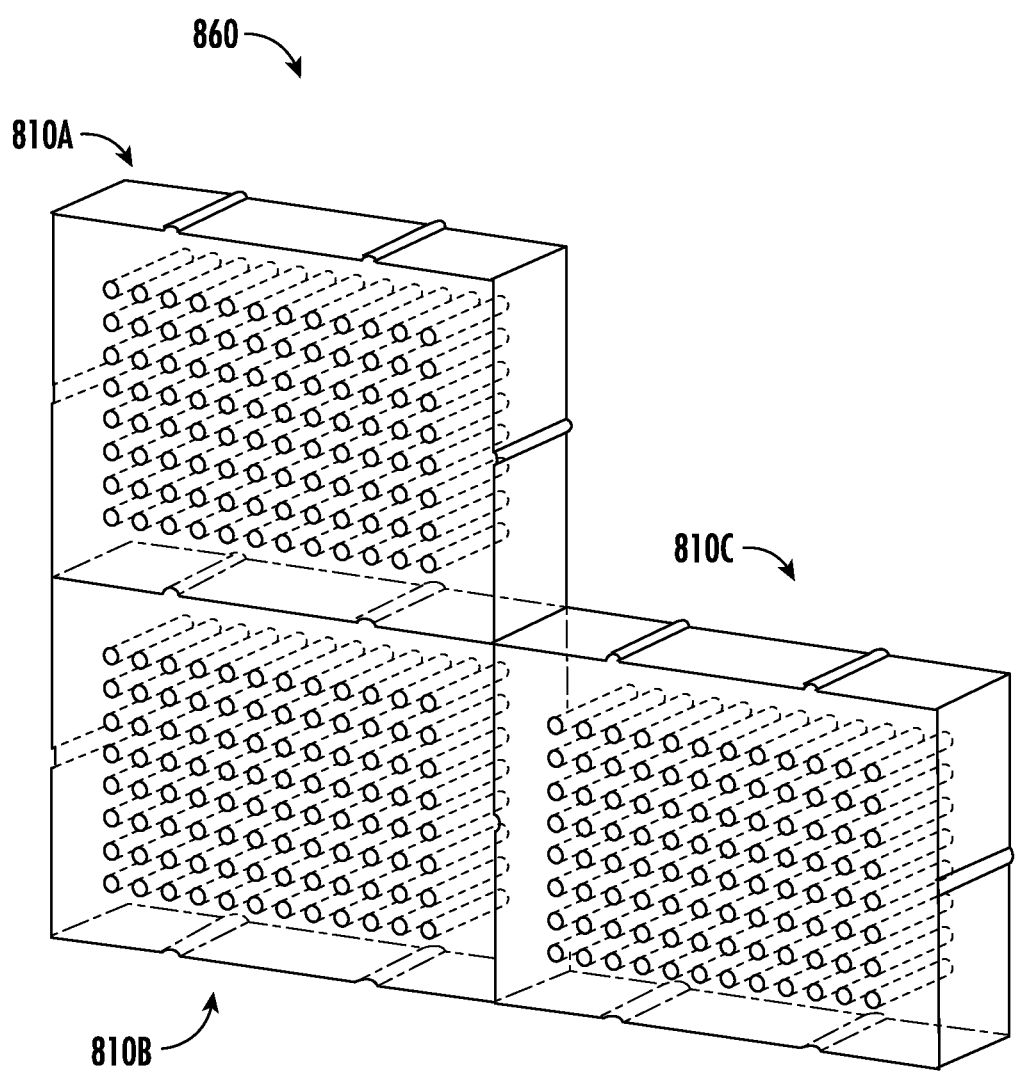
FIG. 38 depicts an example partial array of fiber hole array substrates of FIG. 35 according to one or more embodiments described and illustrated herein.

Multiple fiber hole array substrates or lens array substrates can be stacked together by aligning positive and negative alignment features. FIG. 38 illustrates a partially assembled view of an array 860 of individual fiber hole array substrates 610A-610D (fiber hole array substrate 610B is not shown in FIG. 38). The ridge datum features 650 are disposed within datum notches 612 of adjacent fiber hole array substrates. The array 860 may be provided on another optical component, such as a ferrule end face or an array of lens array substrates.

Precision edges on glass-based optical substrates can enable passive alignment of lens-based connector ferrule components. Below is a brief overview of three different passive assembly techniques that leverage precision edges.

Figure 39:
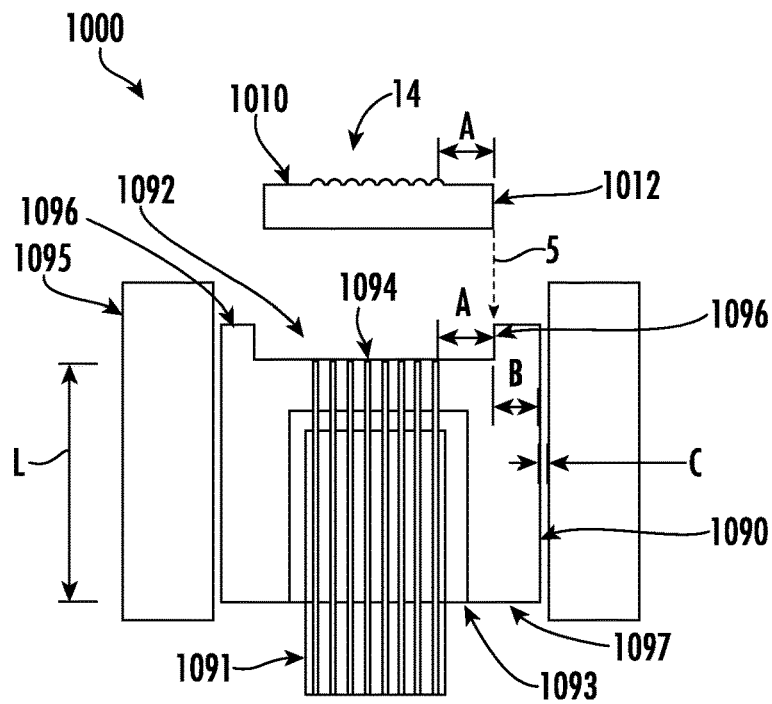
FIG. 39 depicts an example lens-based connector assembly having a lens array substrate with a precision edge according to one or more embodiments described and illustrated herein.

FIG. 39 is an example lens-based connector assembly 1000 comprising a connector element configured as a ferrule 1090, an outer body configured as a ferrule sleeve 1095, a lens array substrate 1010 having an array of lenses 14, and one or more optical fiber arrays 1091. The example lens array substrate 1010 has a precision edge 1012 that is formed by a laser process at a precise offset distance A from the optical axes of lenses located around the perimeter of the lens array 14. As a non-limiting example, the ferrule 1090 is a precision molded plastic ferrule that is fabricated with a fiber hole array 1094 located at the bottom of an end face recess 1092. A fiber array cavity 1093 is also provided for receiving the optical fiber arrays 1091. The recess 1092 is sized to receive the lens array substrate 1010. The recess 1092 also provides sidewall datums 1096 that are located at the precise offset distance A from the centers of fiber holes located around the perimeter of the fiber hole array 1094.

When the lens array substrate 1010 is inserted into the ferrule end face recess 1092 as indicated by arrow 5, the lens centers are aligned with the fiber core centers of optical fibers held in the fiber hole array 1094 of the ferrule 1090. This causes the collimated beams from the lens array 14 to extend parallel to the surface normal of the lens array substrate 1010. Adhesive may be used to hold the lens array substrate 1010 in the ferrule end face recess 1092, for example.

The ferrule 1090 also provides a precise offset distance B between the recess sidewall datums 1096 and the exterior surface of the ferrule 1090. The ferrule exterior surface is designed to fit into a passage 1097 of a ferrule sleeve 1095 with another gap tolerance C. The length L of the sleeve (e.g., 5 mm) along with the expected variations gap tolerance C ensures that angular misalignment of the ferrule 1090 in the ferrule sleeve 1095 will be sufficient to ensure low-loss coupling of expanded beams of mated connectors. The gap tolerance C combined with variations in offset distance B ensure that lateral misalignment of beams is sufficient to provide low loss coupling of expanded beams. A rotational alignment key (not shown) may also be provided to maintain the rotational alignment of the ferrule 1090 in the ferrule sleeve 1095. Using this approach, two lens array ferrules can be aligned to each other in a common ferule sleeve with low optical loss.

Figure 40:
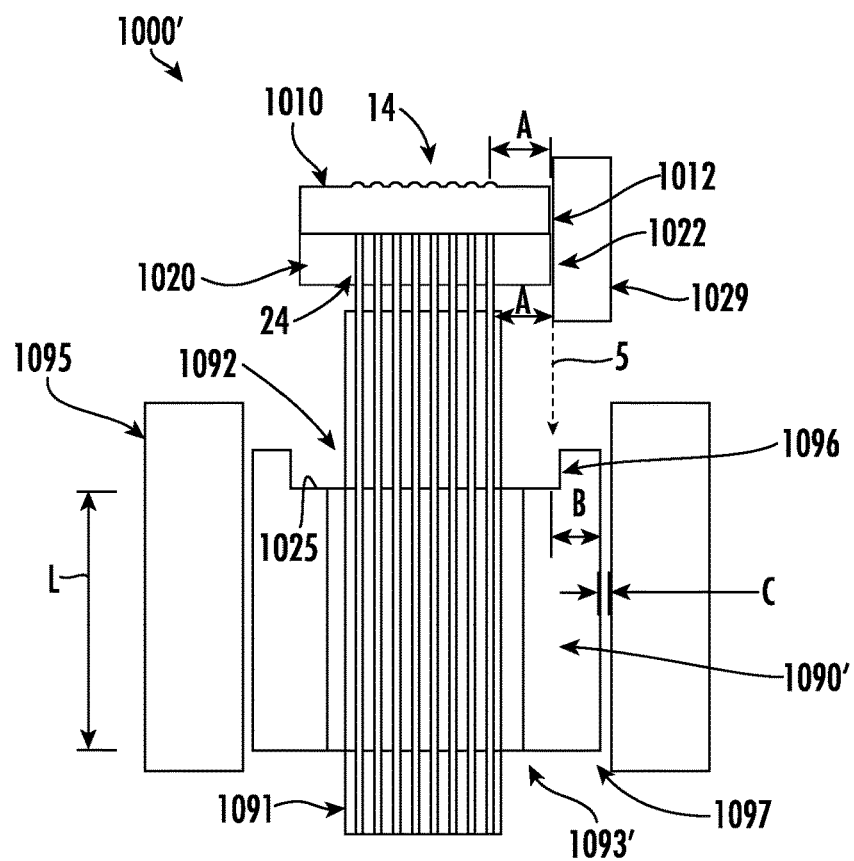
FIG. 40 depicts another example lens-based connector assembly having a lens array substrate and a fiber hole array substrate with precision edges according to one or more embodiments described and illustrated herein.

FIG. 40 illustrates another example lens-based connector assembly 1000' similar to the lens-based connector assembly 1000 of FIG. 39 except the ferrule 1090' does not include a fiber hole array. Rather, the lens-based connector assembly 1000' includes a fiber hole array substrate 1020 having a fiber hole array 24. The lens-based connector assembly 1000' is assembled by aligning the lens array substrate 1010 to the fiber hole array substrate 1020. Alignment is carried out by forcing both the lens array substrate edge 1012 and the fiber hole array substrate edge 1022 into a common temporary jig 1029 that provides a flat reference surface. After alignment, the lens array substrate 1010 and the fiber hole array substrate 1020 may be joined together using UV curable adhesive. This produces a collimated lens array ferrule where the emitted beam is normal to the lens array substrate surface. After adhesive curing, the temporary alignment jig 1029 is removed. In some embodiments, the temporary alignment jig 1029 is coated with a release coating or film to prevent the UV curable adhesive from bonding to the temporary alignment jig 1029.

The fiber hole array substrate 1020 is then inserted into a ferrule end face recess 1092 as indicated by arrow 5 so that the precision edge 1022 of the fiber hole array substrate 1020 aligns with the recess sidewall datums 1096. The ferrule end face 1025 is designed so that its surface is perpendicular to the exterior surface of the ferrule. The one or more optical fiber arrays 1091 pass through the fiber array cavity 1093' and individual optical fibers of the optical fiber arrays 1091 are disposed in the fiber hole array 24. As described above with respect to FIG. 39, the offset distance B between the recess sidewall datum 1096 and the ferrule exterior surface is controlled with the lateral misalignment tolerances of the collimated beam.

Figure 41:
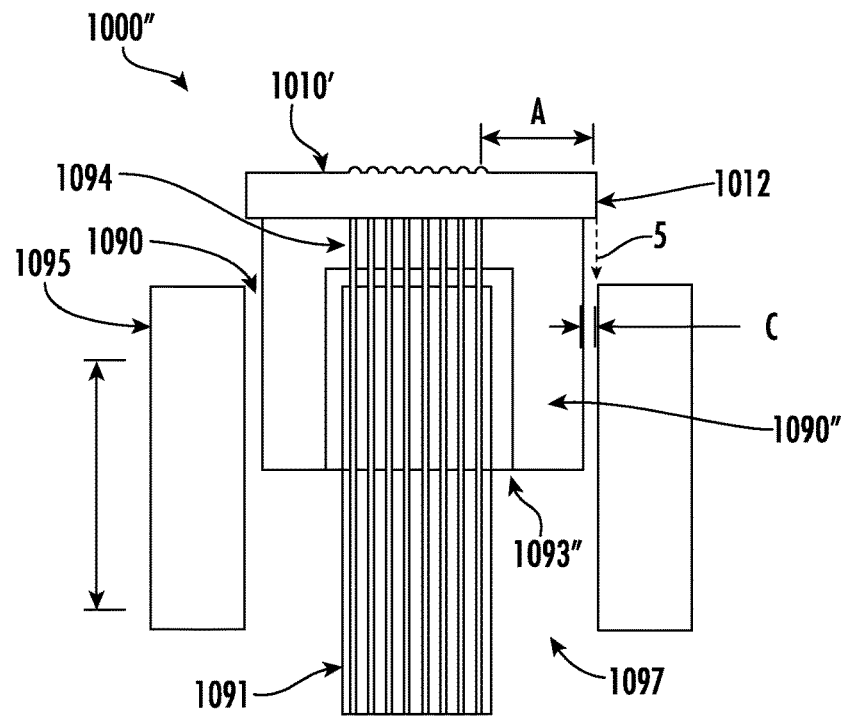
FIG. 41 depicts another example lens-based connector assembly having a lens array substrate with a precision edge according to one or more embodiments described and illustrated herein.

Referring now to the example lens-based connector assembly 1000" of FIG. 41, the precision edge 1012 of the lens array substrate 1010 is used to directly contact and align with the internal diameter of the ferrule sleeve 1095. Therefore, the perimeter edge 1012 of the lens array substrate 1010' operates similarly to a standard ceramic ferrule, in that the distance between the fiber core center and the exterior surface is precisely controlled. In this example, the optical fibers 1192 are held in a fiber hole array 1094 provided by a ferrule 1090". The precision edge 1012 can also include chamfers or other tapered edge features that simplify the process of inserting the lens array substrate 1010' into the ferrule 1090". The ferrule 1090" of this embodiment does not have to provide a precise exterior surface because the precision edge 1012 of the lens array substrate 1010' already provides this function. This simplifies the design and fabrication of the ferrule 1090", which may be injection molded, for example. The gap tolerance C between the exterior surface of the ferrule 1090" and the internal diameter of the ferrule sleeve 1095 can be loose (e.g., 2-5 µm, depending on the length of the ferrule 1090"), while still providing sufficient angular alignment for beams collimated by the lens array substrate 1010'.

Figure 42:
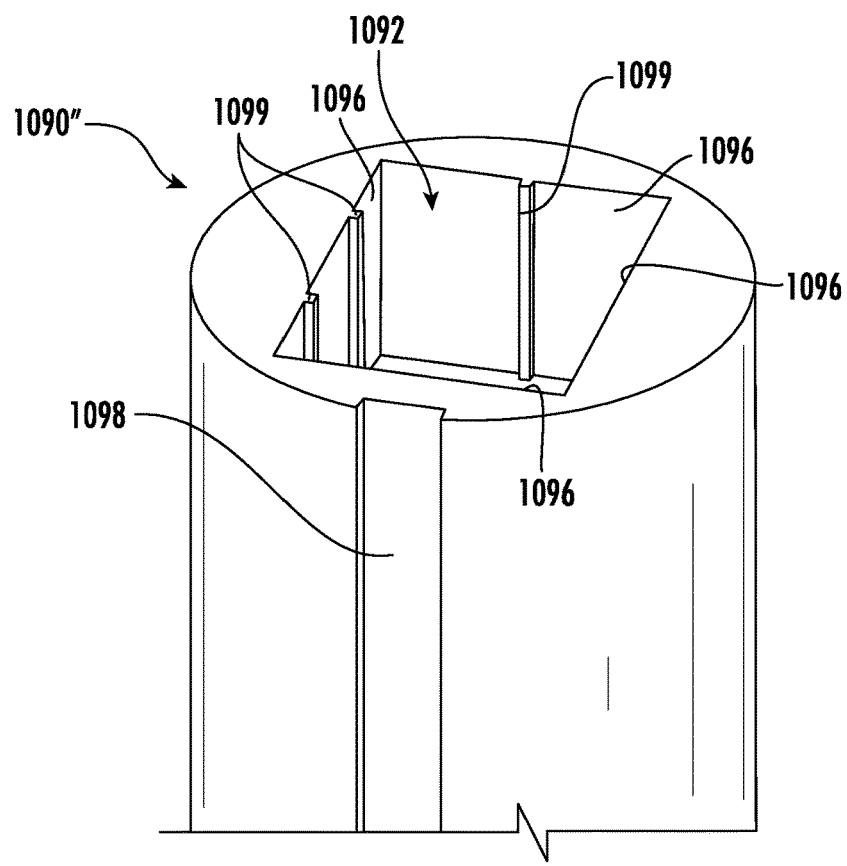
FIG. 42 depicts a perspective view of an example ferrule having a ferrule end face and an end face recess according to one or more embodiments described and illustrated herein.

Example assembly processes for inserting one or more lens array substrates with precise edges into ferrule end face recesses will now be described. FIG. 42 illustrates a perspective view of an example ferrule 1090 with an end face recess 1092. If needed, connector alignment features configured as rib-like positive alignment features 1099 may be provided at locations around the recess sidewall 1096. The example ferrule 1090 also includes an external surface channel 1098 for rotational keying during ferrule-to-ferrule mating.

Figure 43:
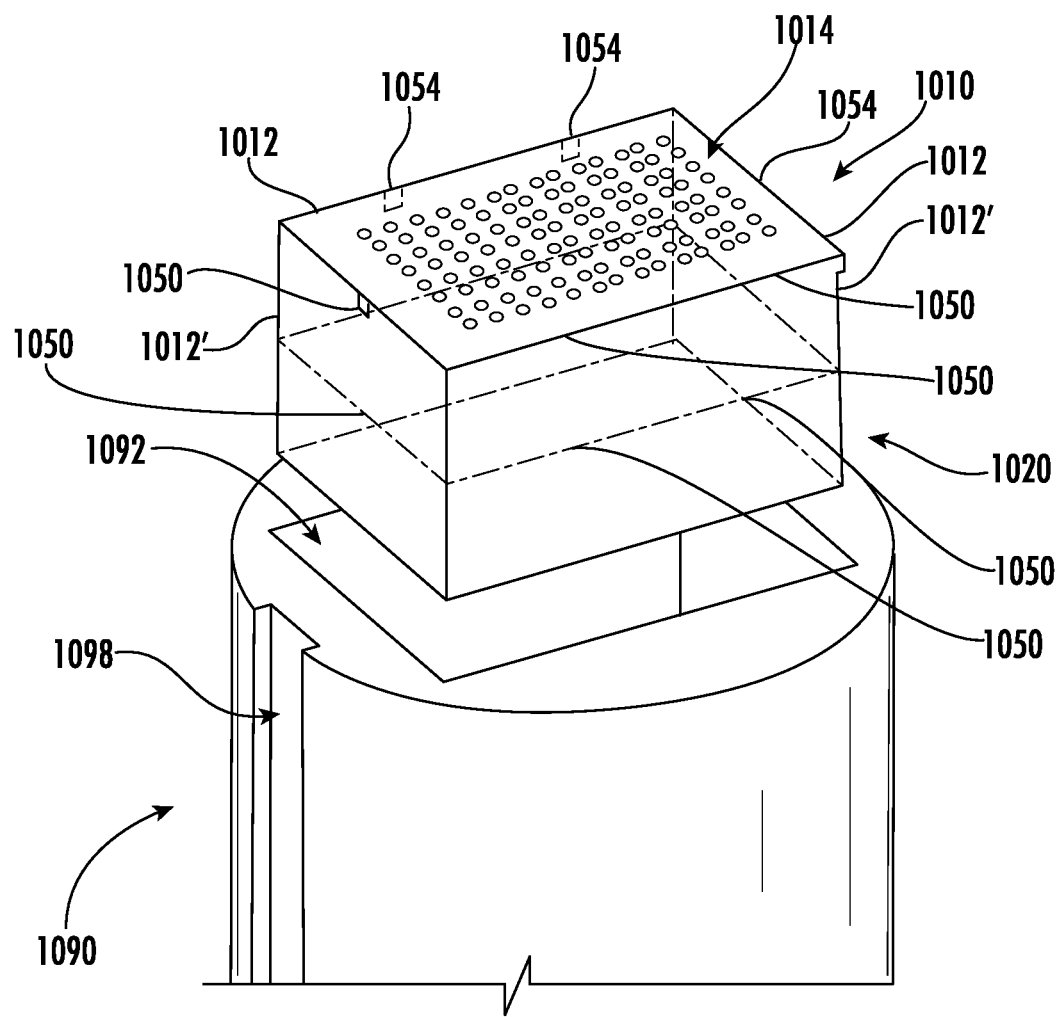
FIG. 43 depicts a perspective view of an example fiber hole array substrate and an example lens array substrate with alignment feature being inserted into the end face recess of the example ferrule of FIG. 42 according to one or more embodiments described and illustrated herein.

Referring to FIG. 43, the fiber hole array substrate 1020 and the lens array substrate 1010 are inserted into the end face recess 1092. The fiber hole array substrate 1020 and the lens array substrate 1010 both have laser-formed alignment features. Two adjacent edges of the substrates provide positive alignment features, while the remaining two edges provide notch datum features. Particularly, the each of the lens array substrate 1010 and the fiber hole array substrate 1020 include three datum notches 1054 and three ridge datum features 1050. It is noted that the positive alignment features 1099 of the recess sidewalls 1096 are not visible in FIG. 43.

Figure 44:
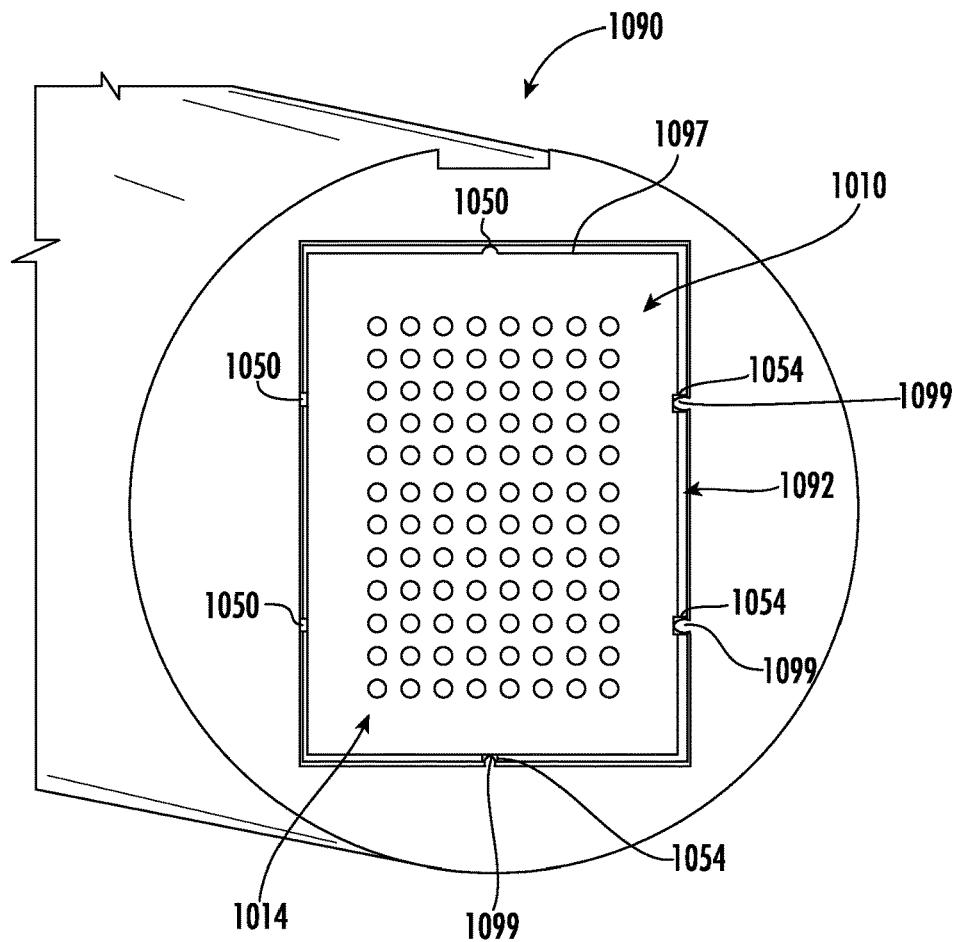
FIG. 44 depicts a front view of the example fiber hole array substrate and the example lens array substrate of FIG. 43 disposed within the end face recess of the example ferrule of FIG. 42 according to one or more embodiments described and illustrated herein.
Figure 45:
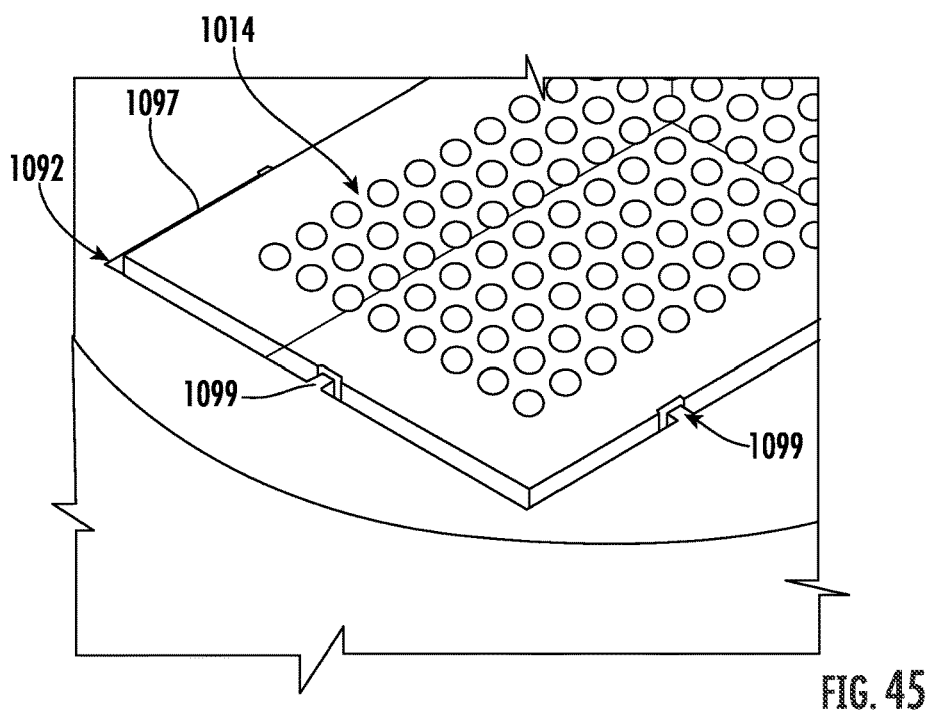
FIG. 45 depicts a perspective view of the example fiber hole array substrate and the example lens array substrate of FIG. 43 disposed within the end face recess of the example ferrule of FIG. 42 according to one or more embodiments described and illustrated herein.

FIG. 44 provides an end face view and FIG. 45 provides a perspective view of the ferrule 1090 after the fiber hole array substrate 1020 and the lens array substrate 1010 have been inserted into the end face recess 1092. The positive alignment features 1099 of the recess sidewalls 1096 mate with the corresponding datum notches 1050 of the lens array substrate 1010 and the fiber hole array substrate 1020, while the ridge datum features 1054 of the lens array substrate 1010 and the fiber hole array substrate 1020 contact the bare (i.e., unfeatured) recess sidewalls 1096.

It may be difficult to precisely control the width of the end face recess 1092. If this is the case, the end face recess 1092 may either be too large or too small for the lens array substrate 1010. To avoid this problem, the end face recess 1092 can be fabricated so that it is slightly wider than necessary. During assembly, the lens array substrate 1010 is biased toward two adjacent sidewalls of the recess, causing the ridge datum features 1054 of the lens array substrate 1010 to contact and align to the recess sidewall 1096.

Figure 46:
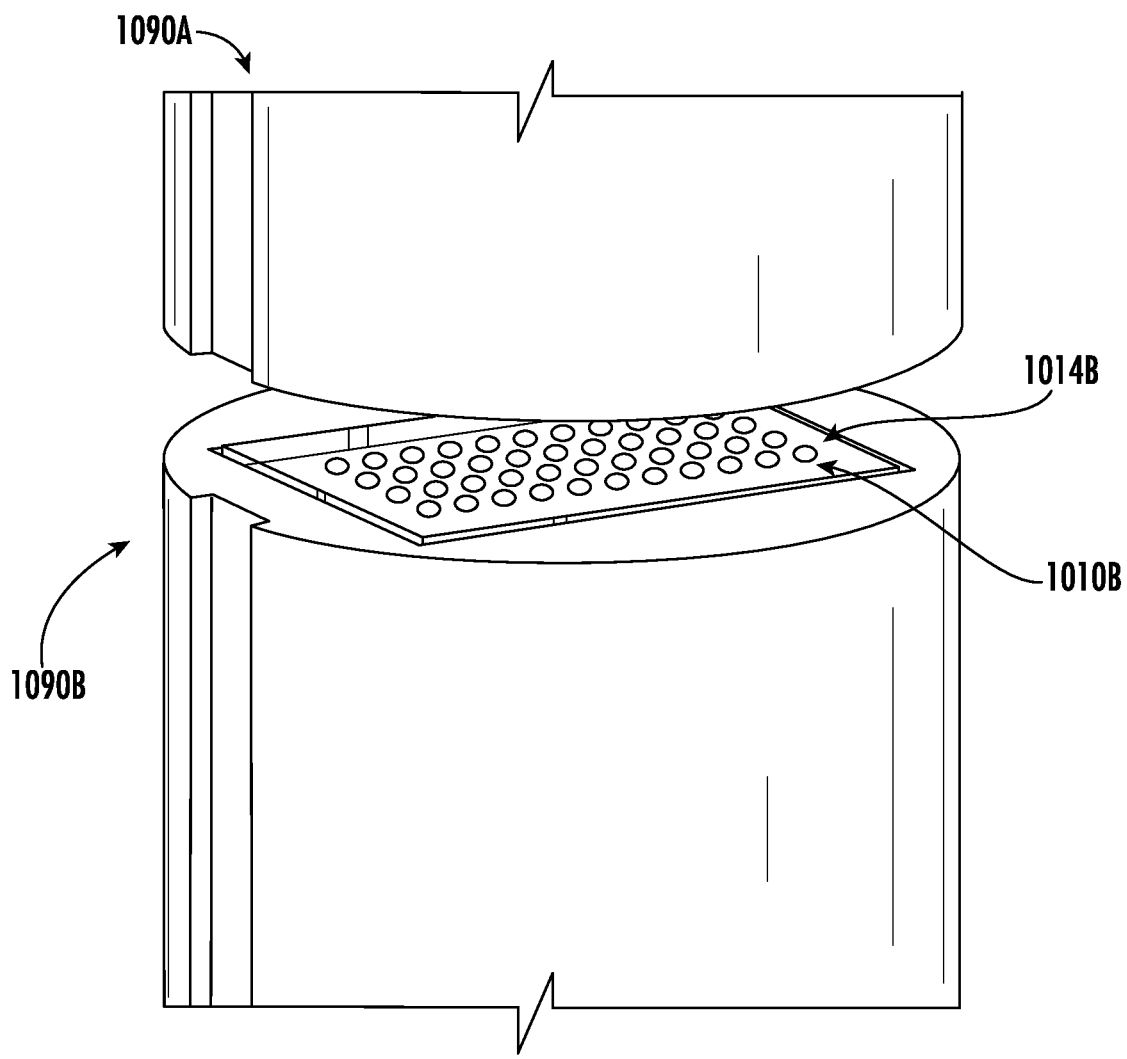
FIG. 46 depicts a perspective view of two mating ferrules according to one or more embodiments described and illustrated herein.
Figure 47:
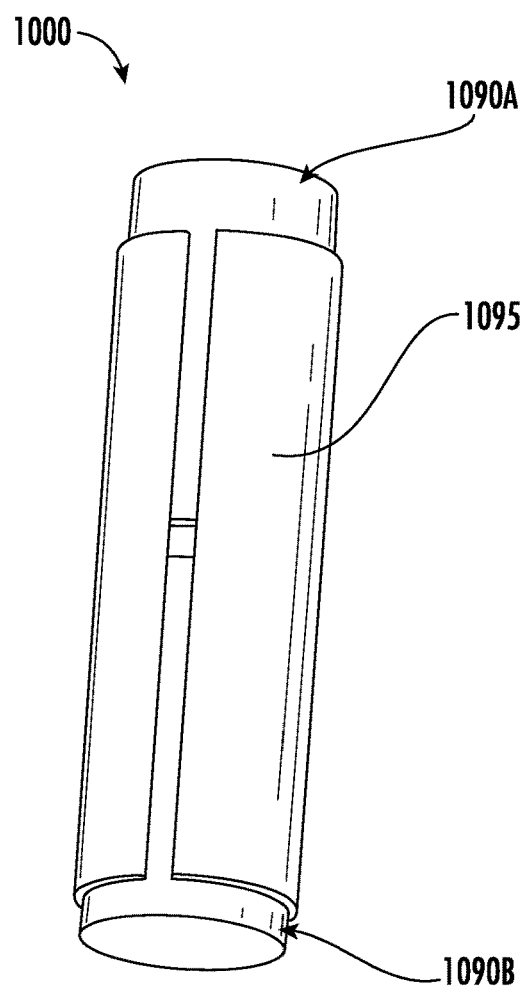
FIG. 47 depicts two mating ferrules within a ferrule sleeve according to one or more embodiments described and illustrated herein.

As shown in FIG. 46, during connector mating, a first lens array substrate 1010A (not visible in FIG. 46) in a first ferrule 1090A is arranged so that it faces a second lens array substrate 1010B in a second ferrule 1090B. The various precision edges and alignment features on glass-based optical substrates and ferrules ensure that the optical axes of the coupling beams are aligned when the two ferrules are placed in a common alignment sleeve 1095, as shown in FIG. 47.

Figure 48:
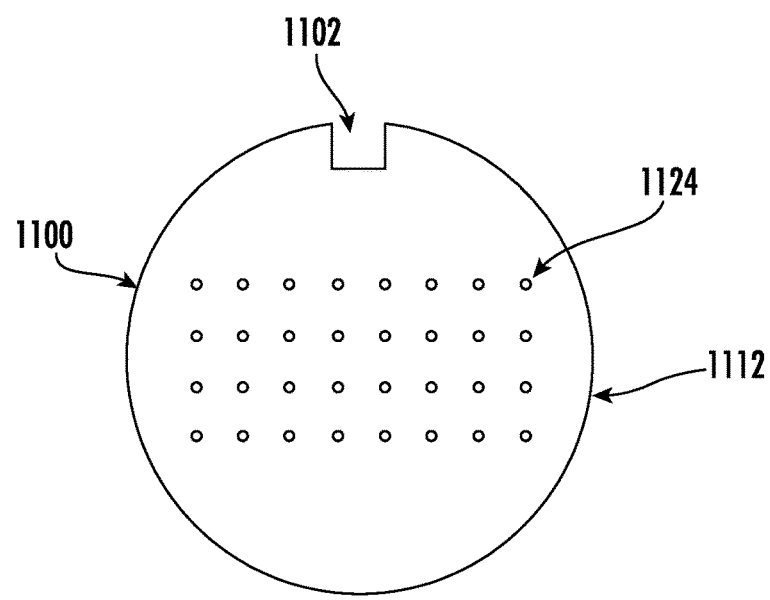
FIG. 48 depicts an example fiber array ferrule according to one or more embodiments described and illustrated herein.

Fiber array ferrules are typically fabricated from injection molded plastic or ceramic materials, where the ferrule provides an array of alignment holes on precision pitch offset from an external cylindrical surface. Approaches for fabricating fiber array ferrules using a precision laser damage and etch process will now be described. FIG. 48 provides a front view of a glass-based fiber array ferrule 1100 that may be coupled to a ferrule body. The example fiber array ferrule 1100 comprises an array of alignment holes 1124 extending between a first end face and a second end face. The array of alignment holes 1124 is laser-formed on a precise X and Y pitch. The example fiber array ferrule 1100 has circular perimeter 1112 but embodiments are not limited thereto (e.g., square, rectangular, hexagonal, triangular, etc.). The circular perimeter may also be fabricated by a laser damage and etch process. The fiber array ferrule 1100 also includes a fiber array ferrule alignment feature 1102 (e.g., a notch) at an outer surface that is used for angular keying of a ferrule assembly when the ferrule is inserted into a ferrule sleeve, as described in more detail below. It should be understood that in some embodiments the fiber array ferrule alignment feature 1102 is configured as a positive feature extending from the edges of the fiber array ferrule 1100.

If a fast laser writing process is available, the fiber array ferrule 1100 can be long in length (e.g., 5-10 mm, extending into the page) to provide precise angular alignment of coupled expanded beams. Write time can be reduced by using a precise laser writing process (e.g., surface variation <0.1-0.2 µm) around the edge 1112 near one or both end faces. The remaining sidewall surfaces can be formed using a more rapid laser writing process that produces a more course and less precise surface (i.e. higher surface roughness, such as 1-5 µm). This more coarse and less precise surface is formed with a slightly smaller outside diameter so that when the ferrule assembly is inserted into a ferrule sleeve, the more coarse and less precise surface plays no role in ferrule alignment. More generally, the surface roughness can be made to vary moving down the axis of the ferrule. The precision edges and/or alignment features described herein have a surface roughness that is less than a surface roughness of the non-precision edges due to the etching process to form the precision edges and/or alignment features.

To reduce total laser writing time and processing cost, it may be preferable to make the fiber array ferrule 1100 out of a thin sheet of glass (e.g., 0.5-1.0 mm thick). The same approach of using coarse and fine laser writing processes as described above for a long ferrule can be used to further reduce the fabrication time for the fiber array ferrule 1100.

Figure 49:
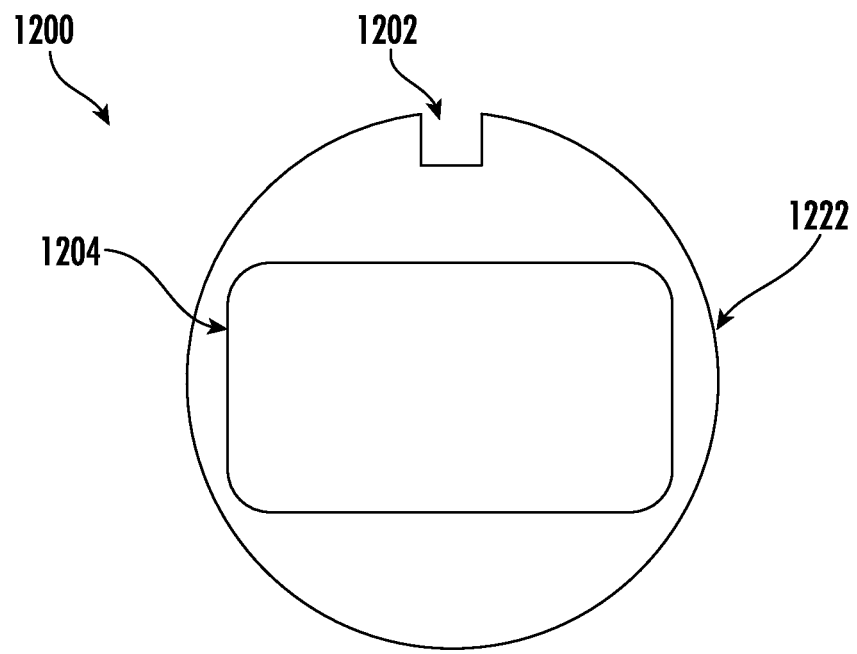
FIG. 49 depicts an example ferrule ring according to one or more embodiments described and illustrated herein.

However, because a long ferrule (e.g., 5-10 mm) may still be required for angular alignment of collimated beams, another approach is to fabricate an additional separate ferrule ring 1200 as shown in FIG. 49 using the laser damage and etch process described above. The ferrule ring 1200 may provide identical exterior surface features as the fiber array ferrule 1100 described above, such as the precision circular edge 1222 and the ring alignment feature 1202 (e.g., a notch) for angular keying. It should be understood that in some embodiments the ring alignment feature 1202 is configured as a positive feature extending from the edges of the ferrule ring 1200. The ferrule ring 1200 also comprises a central opening 1204 that is sized to allow an optical fiber array to be fed through the ferrule ring 1200. In some embodiments, the ferrule ring 1200 can also be chamfered on one or both end faces.

Figure 50:
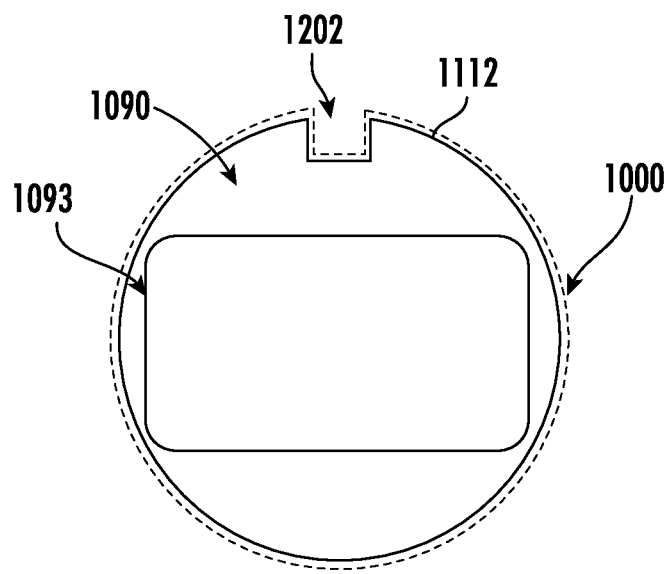
FIG. 50 depicts an example fiber array ferrule coupled to an example ferrule body according to one or more embodiments described and illustrated herein.

In an assembly process, which is described in more detail below, the fiber array ferrule 1100 is mounted on one end face of a ferrule body, which may be an injected molded plastic ferrule body. FIG. 50 provides an end face view of an example ferrule body 1090 having a fiber array cavity 1093, showing how its exterior surface is slightly undersized from the perimeter of an attached fiber array ferrule 1100.

Figure 51:
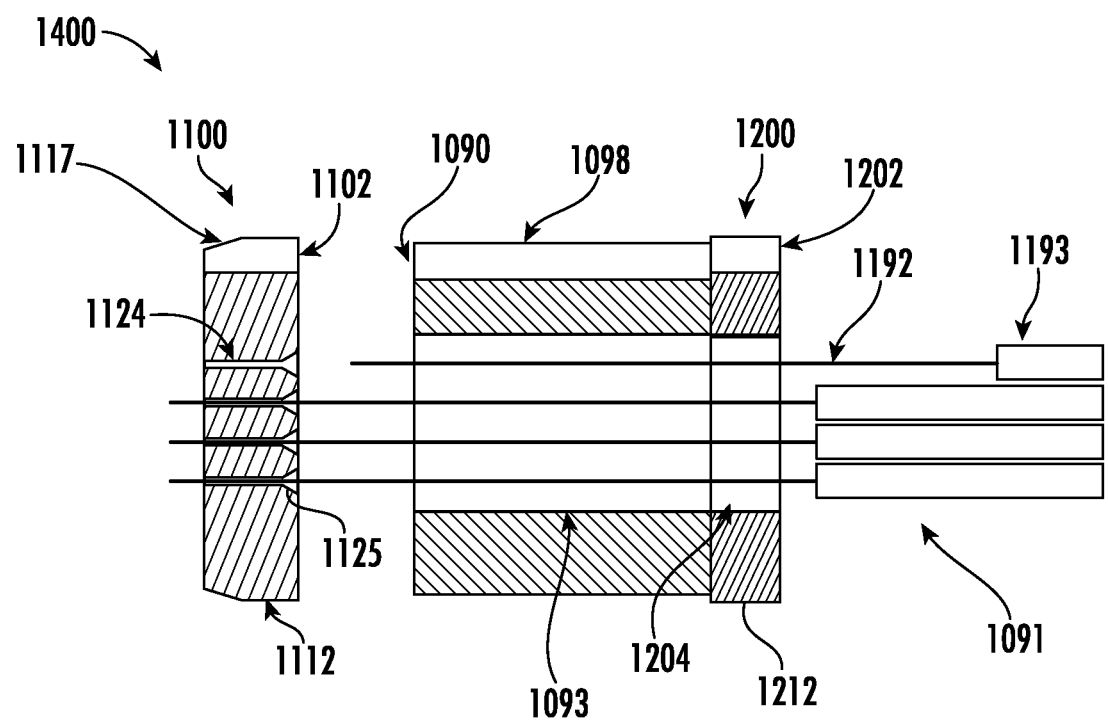
FIG. 51 depicts a partially assembled view of an example optical assembly according to one or more embodiments described and illustrated herein.

Example optical assemblies that may be used in lens-based connectors will now be described. Referring now to FIG. 51, an example optical assembly 1400 configured as a lens array ferrule assembly is illustrated in cross-section. This this example, a fiber array ferrule 1100 is fabricated with laser damaged and etched array of alignment holes 1124 where the holes may or may not have a tapered portion 1125 to ease insertion of optical fibers 1192. A ferrule ring 1200 as shown in FIG. 49 is attached to one end face of a ferrule body 1090, which may be made by injected molded plastic. One or more optical fiber ribbons 1091 are stripped, fed through the opening 1204 of the ferrule ring 1200 and the cavity 1093 of the ferrule body 1090, and then inserted into an array of alignment holes 1124. In some embodiments, the fiber array ferrule 1100 can have a chamfer 1117 such that an area of a front end face is smaller than an area of a rear end face to simplify insertion of the fiber array ferrule 1100 in an alignment sleeve (not shown).

Figure 52:
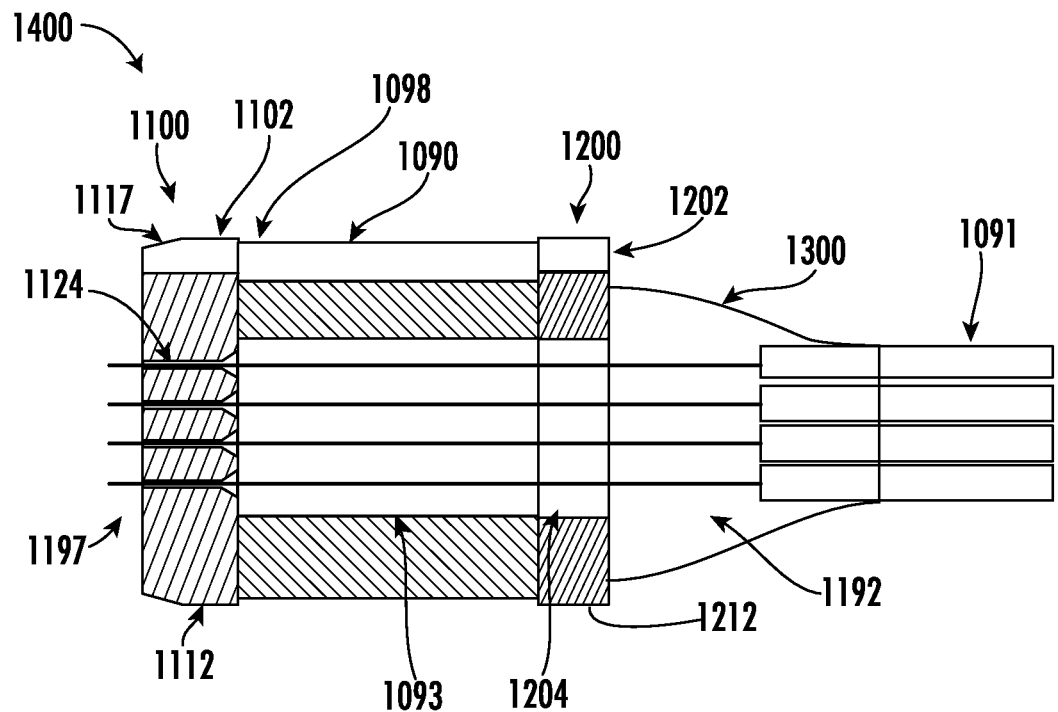
FIG. 52 depicts another partially assembled view of the example optical assembly of FIG. 51 according to one or more embodiments described and illustrated herein.

Next, an end face of the fiber array ferrule 1100 is attached to a corresponding end face of the ferrule body 1090, such as by the use of a UV curable adhesive, for example. Adhesive may also be used to fill the cavity 1093 inside the ferrule body 1090 and the opening 1204 of the ferrule ring 1200, completely surrounding the bare fibers and also providing a strain relief feature 1300 for the one or more optical fiber ribbons 1091, as shown in FIG. 52.

Figure 53:
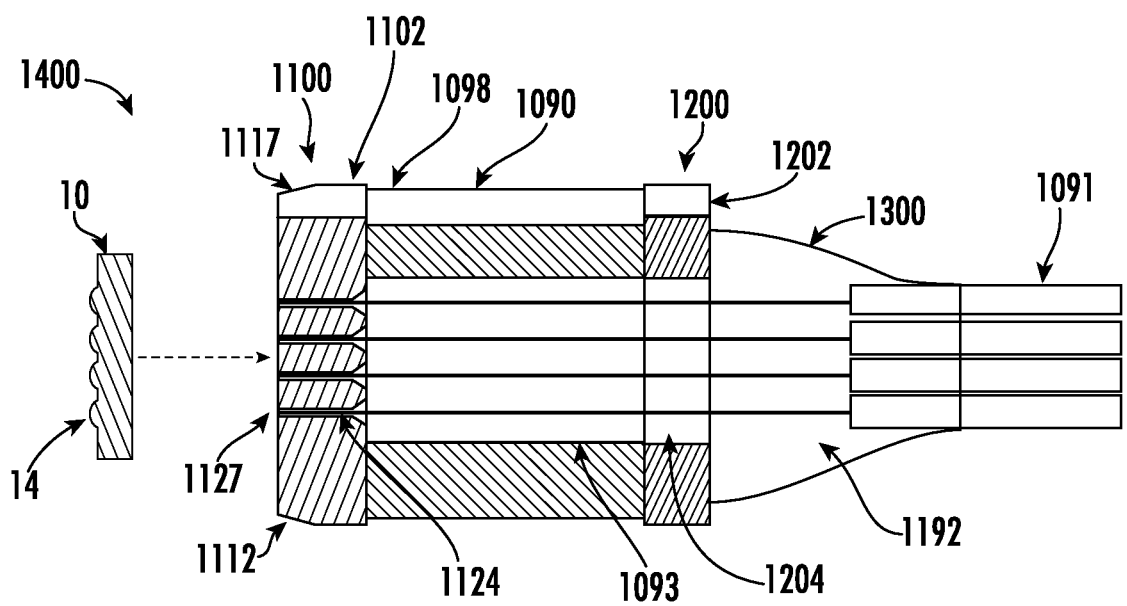
FIG. 53 depicts another partially assembled view of the example optical assembly of FIG. 51 wherein a lens array substrate is aligned with a fiber array ferrule according to one or more embodiments described and illustrated herein.
Figure 54:
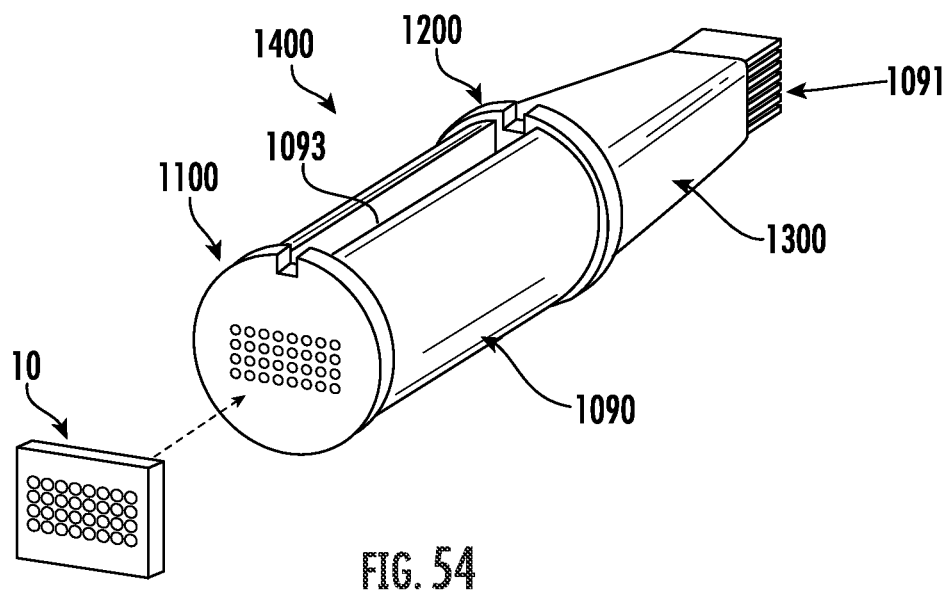
FIG. 54 depicts perspective view of the example optical assembly of FIG. 53 according to one or more embodiments described and illustrated herein.

Any excess length 1197 of optical fiber 1192 extending through the array of alignment holes 1124 is removed via cleaving and polishing, as shown in FIG. 53. A lens array substrate 10 is aligned to a polished end face 1127 of the fiber array ferrule 1100 so that the centers of the lenses 14 are aligned to the centers of the fiber cores of optical fibers 1192 inserted into the array of alignment holes 1124. FIG. 54 illustrates an isometric view of the optical assembly 1400 depicted in FIG. 53. Note that the isometric view of FIG. 54 does not show the optional chamfered edge 1117 on the fiber array ferrule 1100.

Figure 55:
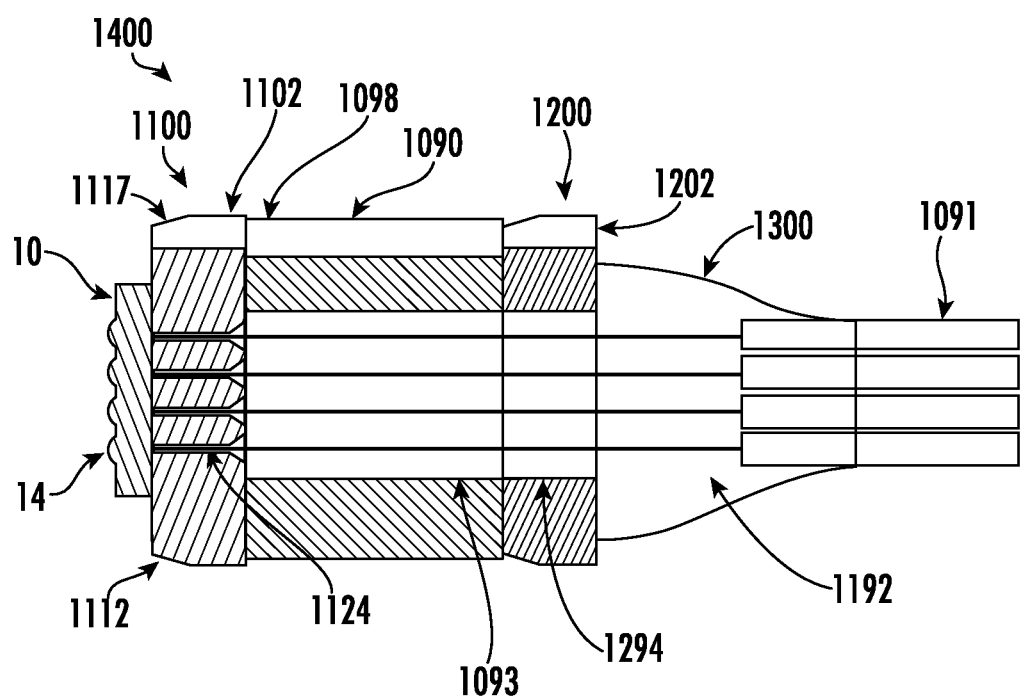
FIG. 55 depicts another example optical assembly according to one or more embodiments described and illustrated herein.
Figure 56:
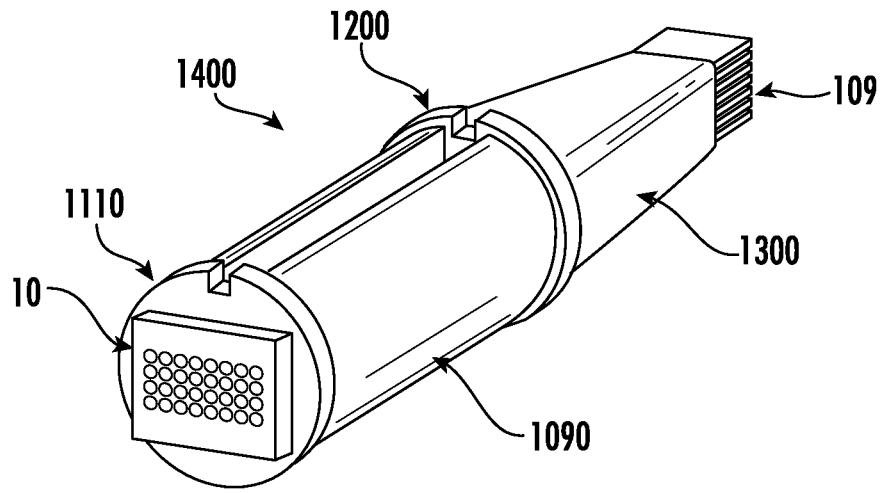
FIG. 56 depicts a perspective view of the example optical assembly of FIG. 55 according to one or more embodiments described and illustrated herein.

The lens array substrate 10 is then attached to the fiber array ferrule 1100 as shown in FIGS. 55 and 56 using a UV curable adhesive, for example. In the example of FIG. 55, the ferrule ring 1200 includes a chamfered edge to prevent the edge of the ferrule ring 1200 from catching when the ferrule is inserted into alignment sleeve 1095.

Figure 57:
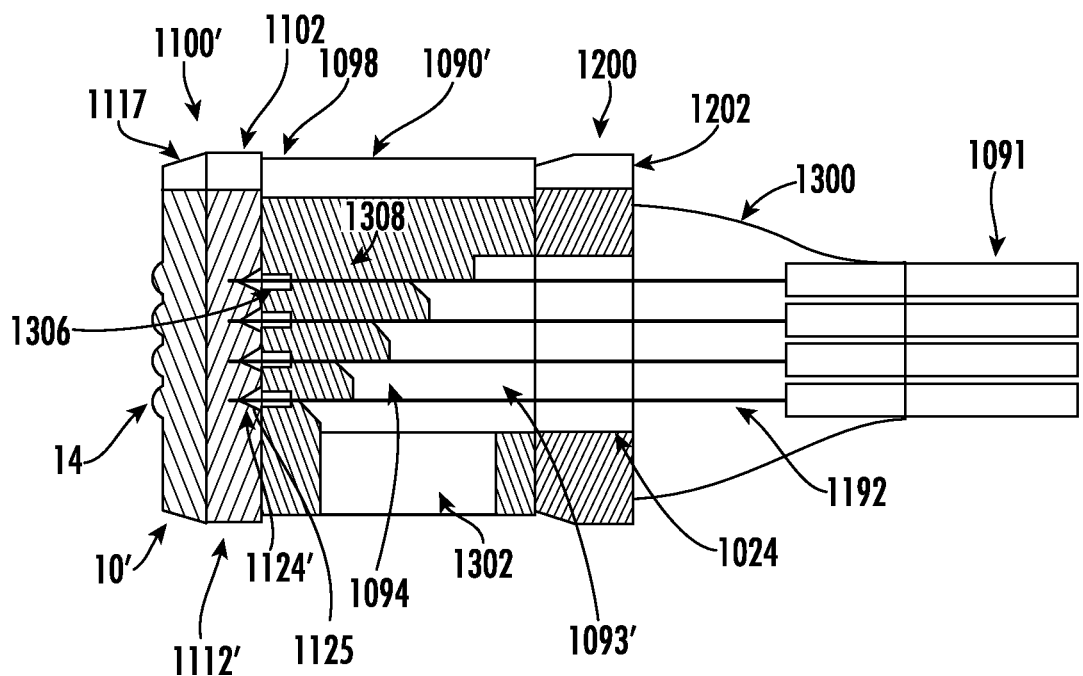
FIG. 57 depicts another example optical assembly according to one or more embodiments described and illustrated herein.

FIG. 57 illustrates a design variant wherein the fiber array ferrule 1100' comprises an integral lens array 14 rather than have the lens array be provided on a separate lens array substrate. The fiber array ferrule 1100' is also laser damaged and etched to provide an array of blind alignment holes 1124' and optional tapers 1125 opposite each lens.

The ferrule body 1090' can provide an array of slightly oversized holes 1093' for guiding bare optical fibers 1192 to the array of blind alignment holes 1124'. The holes 1093' can be variable length as shown in FIG. 57, arranged in rows to create a stepped structure 1094 that allows successive fiber ribbons to be aligned to the holes 1093' of the ferule body 1090' during the fiber insertion process. In some embodiments, a side opening 1302 may be provided in the ferrule body 1090' to enable visual observation of optical fibers during their alignment and insertion into the holes 1093' of the ferrule body 1090'.

Figure 58:
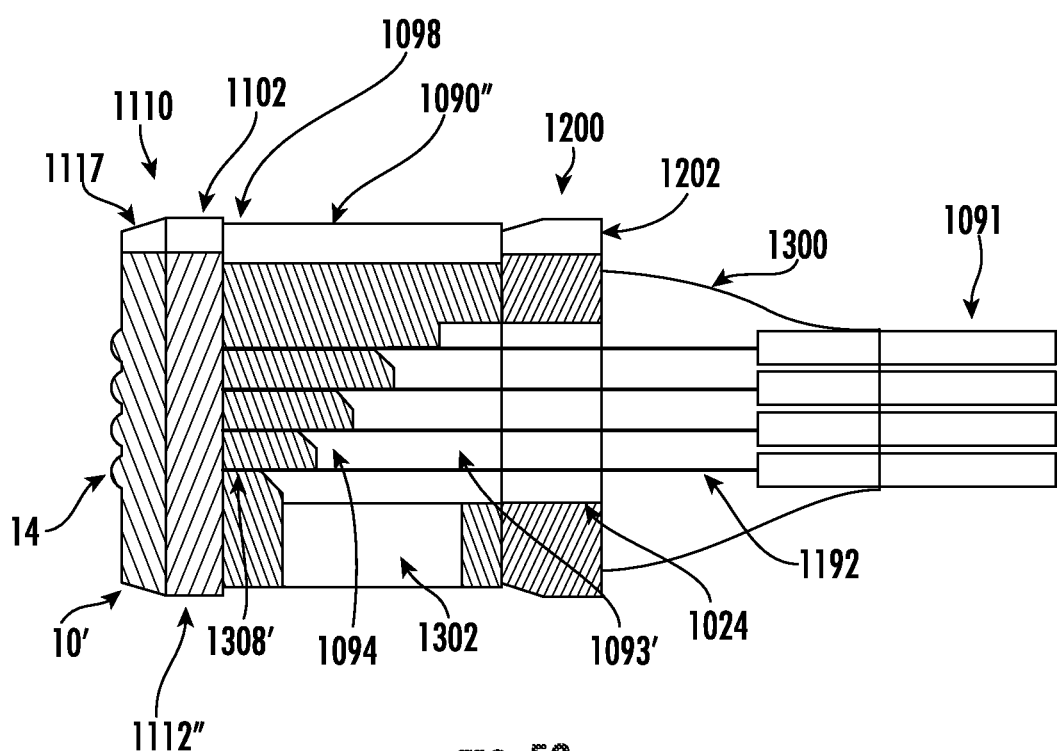
FIG. 58 depicts another example optical assembly according to one or more embodiments described and illustrated herein.

In another embodiment shown in FIG. 58, the ferrule body 1090" provides an array of fiber alignment holes 1308 on a precise pitch. Bare optical fibers 1192 are inserted into the array of fiber alignment holes 1308, bonded in place with an adhesive, and then cleaved and polished to remove any excess length. A lens array substrate 1110 with precision laser formed edges 1112", a chamfered edge 1117 and an alignment feature 1102 is actively aligned so that each lens 14 center is aligned to each fiber core for each optical fiber 1192 in the optical fiber array. The lens array substrate 1110 is then attached to the end face of the ferrule body 1090" using UV curable adhesive.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A lens-based connector assembly comprising:
 a glass-based optical substrate comprising:
  at least one optical element within the optical substrate, wherein the at least one optical element comprises an array of fiber holes; and
  at least one alignment feature positioned at an edge of the glass-based optical substrate; and
 a connector element comprising a recess having an interior surface, the interior surface comprising at least one connector alignment feature, wherein:
  the glass-based optical substrate is disposed within the recess such that the at least one alignment feature of the glass-based optical substrate engages the at least one connector alignment feature and the glass-based optical substrate is fixed to the connector element with an adhesive; and each of the at least one alignment feature and the at least one connector alignment feature comprises a positive alignment feature and a negative alignment feature.

2. The lens-based connector assembly of claim 1, further comprising a lens array substrate comprising an array of lenses, wherein the lens array substrate is coupled to the glass-based optical substrate such that the array of lenses is aligned with the array of fiber holes.

3. The lens-based connector assembly of claim 1, the connector element comprises an array of fiber bores and comprising an array of optical fibers disposed within the array of fiber bores of the ferrule and within the array of fiber holes of the glass-based optical substrate.

4. The lens-based connector assembly of claim 1, wherein:

the connector element comprises a ferrule sleeve;

the optical assembly further comprises a ferrule comprising an array of fiber bores;

the optical assembly further comprises an array of optical fibers disposed within the array of fiber bores and within the array of fiber holes of the glass-based optical substrate; and the ferrule and the glass-based optical substrate is disposed within the ferrule sleeve.

5. The lens-based connector assembly of claim 1, wherein the at least one alignment feature has a surface roughness that is less than a surface roughness of the edge of the glass-based optical substrate.

6. The lens-based connector assembly of claim 5, wherein the at least one optical element comprises an array of optical elements.

7. The lens-based connector assembly of claim 1, wherein the at least one alignment feature comprises the negative alignment feature, and the at least one connector alignment feature comprises the positive alignment feature, and the at least one alignment feature comprises a datum notch at the edge of the optical substrate, and the at least one connector alignment feature comprises a protrusion.

8. The lens-based connector assembly of claim 7, wherein the datum notch is rectangular.

9. The lens-based connector assembly of claim 7, wherein the datum notch is a V-groove.

10. The lens-based connector assembly of claim 1, wherein the at least one alignment feature is the positive alignment feature and the at least one connector alignment feature is the negative alignment feature.

11. The lens-based connector assembly of claim 1, wherein the positive alignment feature comprises a semicircular protrusion.

12. The lens-based connector assembly of claim 1, wherein the positive alignment feature comprises a rectangular protrusion.

13. The lens-based connector assembly of claim 1, wherein the at least one alignment feature comprises at least one of the positive alignment feature and at least one of the alignment feature.

14. The lens-based connector assembly of claim 1, wherein the at least one alignment feature comprises at least one of the positive alignment feature at a first edge and at least one of the negative alignment feature at a second edge.

15. The lens-based connector assembly of claim 1, wherein the at least one alignment feature comprises both the positive alignment feature and the negative alignment feature.

16. The lens-based connector assembly of claim 15, wherein the at least one alignment feature comprise a sinusoidal alignment feature.

17. The lens-based connector assembly of claim 1, wherein the glass-based optical substrate comprises a ledge portion at the edge, and the at least one alignment feature is positioned within the ledge portion.

18. A lens-based connector assembly comprising:

a glass-based optical substrate comprising:

at least one optical element within the optical substrate, wherein the at least one optical element comprises an array of fiber holes; and at least one alignment feature positioned at an edge of the glass-based optical substrate;

a lens array substrate comprising an array of lenses, wherein the lens array substrate is coupled to the glass-based optical substrate such that the array of lenses is aligned with the array of fiber holes; and a connector element comprising a recess having an interior surface, the interior surface comprising at least one connector alignment feature, wherein:

the at least one alignment feature comprise a negative alignment feature, and the at least one connector alignment feature comprises a positive alignment feature, and the at least one alignment feature comprises a datum notch at the edge of the optical substrate, and the at least one connector alignment feature comprises a protrusion; and the glass-based optical substrate is disposed within the recess such that the at least one alignment feature of the glass-based optical substrate engages the at least one connector alignment feature and the glass-based optical substrate is fixed to the connector element with an adhesive.

19. The lens-based connector assembly of claim 18, the connector element comprises an array of fiber bores and comprising an array of optical fibers disposed within the array of fiber bores of the ferrule and within the array of fiber holes of the glass-based optical substrate.

20. The lens-based connector assembly of claim 19, wherein:

the connector element comprises a ferrule sleeve;

the optical assembly further comprises a ferrule comprising an array of fiber bores;

the optical assembly further comprises an array of optical fibers disposed within the array of fiber bores and within the array of fiber holes of the glass-based optical substrate; and the ferrule and the glass-based optical substrate is disposed within the ferrule sleeve.

21. The lens-based connector assembly of claim 18, wherein the at least one alignment feature has a surface roughness that is less than a surface roughness of the edge of the glass-based optical substrate.

22. The lens-based connector assembly of claim 18, wherein the at least one optical element comprises an array of optical elements.

23. The lens-based connector assembly of claim 18, wherein the datum notch is rectangular.

24. The lens-based connector assembly of claim 18, wherein the datum notch is a V-groove.

25. The lens-based connector assembly of claim 18, wherein the glass-based optical substrate comprises a ledge portion at the edge, and the at least one alignment feature is positioned within the ledge portion.

\* \* \* \* \*

UNITED STATES PATENT AND TRADEMARK OFFICE
CERTIFICATE OF CORRECTION

PATENT NO. : 11,808,992 B2  
APPLICATION NO. : 17/344329  
DATED : November 7, 2023  
INVENTOR(S) : Jeffery Alan DeMeritt et al.

Page 1 of 1

It is certified that error appears in the above-identified patent and that said Letters Patent is hereby corrected as shown below:

On the Title Page

Item (57), in Column 2, in "Abstract", Line 12, delete "surface," and insert -- surface. --.

In the Claims

In Column 21, Line 63, in Claim 13, before "alignment" insert -- negative --.

Signed and Sealed this
Fourteenth Day of May, 2024

Katherine Kelly Vidal  
*Director of the United States Patent and Trademark Office*